United States Patent [19]

Begland

[11] 3,912,724
[45] Oct. 14, 1975

[54] PREPARATION OF DISPERSE BISANIL DYES DERIVED FROM DIAMINOMALEONITRILE

[75] Inventor: Robert Walter Begland, Wilmington, Del.

[73] Assignee: E. I. Du Pont de Nemours and Company, Wilmington, Del.

[22] Filed: Jan. 3, 1974

[21] Appl. No.: 430,415

[52] U.S. Cl. ...... 260/240 G; 260/465 E; 260/566 F; 260/465 D
[51] Int. Cl.² .......................................... C09B 55/00
[58] Field of Search .......... 260/240 G, 465 E, 566 F

[56] References Cited
UNITED STATES PATENTS

| | | | |
|---|---|---|---|
| 2,388,903 | 11/1945 | Cantrell et al. | 260/240 G |
| 2,930,795 | 3/1960 | Biel | 260/240 G X |
| 3,132,140 | 5/1964 | Jaffe | 260/240 G |

FOREIGN PATENTS OR APPLICATIONS

| | | | |
|---|---|---|---|
| 1,305,327 | 10/1962 | France | 260/240 G |
| 1,296,647 | 6/1969 | Germany | 260/240 G |

*Primary Examiner*—Allen B. Curtis

[57] ABSTRACT

Extremely bright, tinctorially strong disperse dyes derived from diaminomaleonitrile and selected aromatic and heterocyclic aldehydes, and their preparation, useful for dyeing and printing polyester and polyester-cotton blend fibers in yellow to blue shades of generally good fastness properties, which dyes are of the general formula $$Ar_1-CH=N-C(CN)=C(CN)-N=CH-Ar_2$$

wherein $Ar_1$ and $Ar_2$ are aromatic or aromatic-like groups, for example, phenyl or pyridyl.

9 Claims, No Drawings

PREPARATION OF DISPERSE BISANIL DYES DERIVED FROM DIAMINOMALEC-NITRILE

BACKGROUND OF THE INVENTION

1. Field of the Invention

This invention relates to yellow to blue bisanil disperse dyes prepared from diaminomaleonitrile.

2. Description of the Prior Art

Monocondensation products of diaminomaleonitrile with various aldehydes are known in the art. Onoda in *Nippon Nogeikagaku Kaishi*, 36 (2), 167–72 (1962) discloses yellow monocondensation products of diaminomaleonitrile with aldehydes; the products are of the formula

$$Ar-CH=N-C(CN)=C(CN)-NH_2$$

wherein Ar is either phenyl, p-dimethylaminophenyl or furfuryl. Robertson and Vaughan in *J. Am. Chem. Soc.*, 80, 2691 (1958) disclose yellow monocondensation products of such formula wherein Ar is either p-hydroxyphenyl, p-nitrophenyl or cinnamyl. Reported attempts to introduce a second mole of the same aldehyde appear to have been unsuccessful and attempts to introduce a second mole of a different aldehyde with the monoanil (Schiff base) resulted in displacement of the aldehyde residue of the original derivative. Such displacement facilely occurred when the second aldehyde possessed a carbonyl carbon atom of greater electron deficiency than the original aldehyde; for example, p-nitrobenzaldehyde > benzaldehyde > p-hydroxybenzaldehyde (descreasing order of facility of displacement.). Hinkel et al. in *J. Chem. Soc.*, 1432 (1937) disclose yellow moncondensation products of such formula wherein Ar is either phenyl, p-anisyl, salicyl or m-bromosalicyl. None of the aforementioned references discloses that the monoadducts of diaminomaleonitrile and aldehydes are useful as dyestuffs for synthetic fibers, especially polyester fibers.

U.S. Pat. No. 2,200,689 discloses a heterocyclic pyrazinocyanine pigment dyestuffs which are obtainable by condensing diaminomaleonitrile with 1,2-dicarbonyl compounds, such as diacetyl, glyoxal, benzil, ortho-benzoquinone, acenaphthenequinones, thionaphthenequinones, phenanthrenequinones and aceanthrenequinones, at about 100°–300°C. in the presence of a solvent, pyridine and a metal salt. They are described as having good fastness properties.

Linstead et al. in *J. Chem. Soc.*, 911 (1937) describe a variety of phthalocyanine-type pigments which vary in color from blue to green with increasing molecular weight; they are prepared by treatment of 2,3-dicyanopyrazines of the formula wherein R is H, $CH_3$ or phenyl with copper salts. The 2,3-dicyanopyrazines can be prepared by condensation of diaminomaleonitrile with, respectively, glyoxal, diacetyl and benzil.

OBJECTS AND SUMMARY OF THE INVENTION

The dye trade is continuously seeking new and better dyes for use in existing and newly developed dyeing and printing systems and for use with fibers, blended fibers and fabrics, which fabrics may, for example, be subjected to an after-treatment (after-dyeing) step, such as the application of a permanent press resin composition, to impart a particularly desirable property to the dyed fabric. Dyes which combine brightness of shade and high tinctorial strength with good application and fastness properties are particularly useful in such systems. Bright dyes are more attractive than dull dyes and offer greater versatility in formulating mixed shades. Commercial disperse dyes for use on polyester and other synthetic and semi-synthetic fibers tend as a class to have rather dull shades. Bright disperse dyes often suffer from poor lightfastness or high cost, or both.

It is an object of this invention to provide yellow to blue disperse dyes. It is a further object to provide dyes which exhibit outstanding brightness of shade and high tinctorial strength and which are generally fluorescent and significantly brighter than known existing disperse dyes. It is a still further object to provide disperse dyes with acceptable fastness to light and sublimation on polyester and polyester-cellulosic blend fibers. Yet another object is to provide economically attractive dyes derived from inexpensive starting materials. A further object is to provide a variety of processes for preparing such dyes.

In summary, this invention relates to bisanil disperse dyes (and their preparation) of the formula $Ar_1-CH=N-C(CN)=C(CN)-N=CH-Ar_2$ wherein each of $Ar_1$ and $Ar_2$ is independently selected from 1. benzo(5- and 6-membered)heterocyclic groups containing 0–4 methyl substituents and
2. phenyl, naphthyl, 5-membered heterocyclic and 6-membered heterocyclic groups containing 0–3 substituents selected from $NO_2$, halogen, CN, $C_{1-4}$alkyl, $C_{1-4}$alkoxy, $OCH_2$-phenyl, phenyl, $CF_3$, OH, $OC_{1-4}$alkylene-$N(C_{1-4}$alkyl$)_2$, $C_{2-4}$alkylene-Cl, $NHCONH_2$, NHCOA, $NHSO_2A$, $SR_8$, $SO_2R_8$, $NHR_1$, $NHCOC_{1-4}$alkylene-B and -$NR_1R_2$ wherein:

a. $R_1$ is $C_{1-4}$alkyl or $C_{2-4}$alkylene-$R_3$;
    b. $R_2$ is $C_{1-4}$alkyl, $C_{2-4}$alkylene $R_4$ or, if $Ar_1$ or $Ar_2$ is phenyl, $C_3$alkylene attached to a phenyl position which is otho to the position to which the nitrogen is attached;
    c. $R_3$ is CN, halogen, OH, phenyl, $C_{1-4}$alkoxy, $OC_{1-4}$alkylene-CN, $CO_2A$, OCOA, OCONHA or $CO_2C_{1-4}$alkylene-OCOA;
    d. $R_4$ is CN, halogen, OH, phenyl, $OC_{1-4}$alkylene-CN, $CO_2A$, OCOA, $CO_2C_{1-4}$alkylene-OCOA, $SO_2A$, phthalimido succinimido, glutarimido, $OCOCH=CH_2$, $CH_2$-$CH(OCOA)CH_2OA$ or $CH_2CH(OCONHA)CH_2OA$;
    e. A is $C_{1-4}$alkyl or $R_5$;
    f. B is halogen, $C_{1-4}$alkoxy or $R_5$;
    g. $R_5$ is phenyl containing 0–2 substituents selected from $C_{1-4}$alkyl, $C_{1-4}$alkoxy, halogen, $NO_2$, CN, $C_{1-4}$alkylCONH and $NR_6R_7$ wherein each of $R_6$ and $R_7$ is independently selected from H and $C_{1-4}$alkyl, with at least one of $R_6$ and $R_7$ being $C_{1-4}$alkyl; and
    h. $R_8$ is $C_{alkyl, alkyl}, C_2H_4OH$, $C_{5-6}$cycloalkyl or $R_5$.

DETAILED DESCRIPTION OF THE INVENTION

The bisanil dyes of the above formula can exist in two isomeric forms, the cis arrangement.

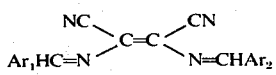

and the trans arrangement

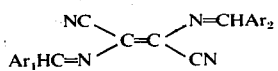

Furthermore, the dyes can be symmetrical (if $Ar_1$ and $Ar_2$ are identical) or unsymmetrical (if $Ar_1$ and $Ar_2$ are different). The dyes can be prepared by condensing diaminomaleonitrile with the aldehydes $Ar_1CHO$ and $Ar_2CHO$ as hereinafter described, $Ar_1CHO$ and $Ar_2CHO$ being the same or different. The present invention also relates to additional processes for preparing the heretofore defined symmetrical and unsymmetrical, cis-and trans-bisanil dyes.

Diaminomaleonitrile is generally referred to as HCN tetramer since it is available in low yields from the base catalyzed tetramerization of HCN as shown in U.S. Pat. No. 2,499,441. Tetramerization of HCN to diaminomaleonitrile also occurs in the presence of a catalytic amount of a basic catalyst and at least one of the cocatalysts diiminosuccinonitrile or cyanogen as shown in U.S. Pat. No. 3,629,318. Tetramerization of HCN in a aprotic solvent, such as dimethylsulfoxide, in the presence of a catalyst, such as sodium cyanide, at 60°–70°C. at atmospheric pressure, as shown in U.S. Pat. No. 3,704,797, provides yet another route to diaminomaleonitrile; such a procedure also is described in Chemical Week, July 12, 1972, page 36 and in European Chemical News, Mar. 2, 1973, page 20. Diaminomaleonitrile also can be prepared from diiminosuccinonitrile which itself is preparable, according to *J. Org. Chem.*, 37, 4133 (1972), in high yield by the base catalyzed addition of HCN to cyanogen. Diiminosuccinonitrile can be converted by chemical reagents to diaminomaleonitrile, for example, by reaction thereof with HCN as shown in U.S. Pat. No. 3,564,039. Diaminomaleonitrile also can be prepared by reaction of diiminosuccinonitrile with hydrogen in the presence of a Group VIII transition metal hydrogenation catalyst as shown in U.S. Pat. No. 3,551,473.

The yellow to blue unsymmetrical bisanil disperse dyes can be prepared by condensing 1 mole of diaminomaleonitrile with 1 mole each of different aryl aldehydes $Ar_1CHO$ and $Ar_2CHO$. Symmetrical bisanil dyes can be prepared by condensing 1 mole of diaminomaleonitrile with 2 moles of a single aryl aldehyde.

Examples of substituted aryl aldehydes, $Ar_1CHO$ and/or ArCHO, which are useful in the preparation of the bisanil dyes are given in Table I.

TABLE I

4-[N,N-bis(methyl)amino]benzaldehyde
4-bromo-2,2-diisopropylbenzaldehyde
4-[N,N-bis(n-propyl)amino]-2-methylbenzaldehyde
6-formyl-N-(methyl)-2,2,4,7-tetramethyl-1,2,3,4-tetrahydroquinoline
5-bromothiophene-2-carboxaldehyde
4'-[N-ethyl-N-(2-methoxycarbonylethyl)amino]-2-methylbenzaldehyde
4'-[N-(2-butoxycarbonylethyl)-N-ethylamino]-2'-methylbenzaldehyde
4-ethylcarbonylamidobenzaldehyde
N-methylindole-3-carboxaldehyde
4-thiomethoxybenzaldehyde
4-thio-n-butoxybenzaldehyde
4-thiomethoxynaphthaldehyde
4-phenylsulfonylbenzaldehyde
4-methylsulfonylbenzaldehyde
4-thio-(2'-hydroxyethoxy)benzaldehyde benzaldehyde
4-(N-cyanoethyl-N-methylamino)benzaldehyde
4-chlorobenzaldehyde
2,6-dichlorobenzaldehyde
2-nitrobenzaldehyde
3-nitrobenzaldehyde
4-nitrobenzaldehyde
4-[N,N-bis(ethyl)amino]benzaldehyde
4-[N,N-bis(ethyl)amino]-2-hydroxybenzaldehyde
3-hydroxybenzaldehyde
2-hydroxybenzaldehyde
4-hydroxybenzaldehyde
4-[N-cyanoethyl-N-ethylamino]-2-methylbenzaldehyde
4-[N,N-bis(hydroxyethyl)amino]benzaldehyde
4-[N,N-bis(cyanoethyl)amino]benzaldehyde
4-[N,N-bis(n-propyl)amino]benzaldehyde
3-chloro-4-hydroxy-5-methoxybenzaldehyde
4-chloro-3-nitrobenzaldehyde
5-chloro-2-nitrobenzaldehyde
3,4-dibenzyloxybenzaldehyde
3,5-dibromosalicylaldehyde
3,5-di-tert.-butyl-4-hydroxybenzaldehyde
4'-[2-(diethylamino)-ethoxy]benzaldehyde
2,5-dihydroxybenzaldehyde
3,4-dihydroxybenzaldehyde
2,3-dimethyl-4-methoxybenzaldehyde
2,5-dimethyl-4-methoxybenzaldehyde
2,4-dimethylbenzaldehyde
2,5-dimethylbenzaldehyde
2-ethoxybenzaldehyde
4-ethoxybenzaldehyde
3-ethoxy-4-hydroxybenzaldehyde
4-cyanobenzaldehyde
4-acetamidobenzaldehyde
2-methoxybenzaldehyde
3-methoxybenzaldehyde
3-benzyloxybenzaldehyde
4-benzyloxybenzaldehyde
4-biphenylcarboxaldehyde
5-bromo-2-methoxybenzaldehyde
2-bromobenzaldehyde
3-bromobenzaldehyde
5-bromosalicyaldehyde
5-bromovanillin[5-bromo-4-hydroxy-3-methoxybenzaldehyde]
5-bromo-3,4-dimethoxybenzaldehyde
6-bromo-3,4-dimethoxybenzaldehyde
2'-(2-chloroethyl)benzaldehyde
2-chloro-6-fluorobenzaldehyde
4-ethoxy-3-methoxybenzaldehyde
3-ethoxysalicylaldehyde
3-fluoro-4-methoxybenzaldehyde
3-fluorobenzaldehyde
4-fluorobenzaldehyde
3-hydroxy-4-methoxybenzaldehyde
2-hydroxy-4-methoxybenzaldehyde
2-hydroxy-5-methoxybenzaldehyde
4-hydroxy-3-methoxybenzaldehyde (vanillin)
2-hydroxy-1-naphthaldehyde 3-hydroxy-4-nitrobenzaldehyde
4-hydroxy-3-nitrobenzaldehyde
5-hydroxy-2-nitrobenzaldehyde
2,4,6-trimethylbenzaldehyde (mesitaldehyde)
2-methoxy-1-naphthaldehyde
4-methoxy-1-naphthaldehyde
3-methyl-4-methoxybenzaldehyde
4-hydroxy-3-methoxy-5-nitrobenzaldehyde (5-nitrovanillin)
3,4-dimethoxy-6-nitrobenzaldehyde
2-methylbenzaldehyde
3-methylbenzaldehyde
4-methylbenzaldehyde
2,4,6-triethoxybenzaldehyde
2,3,4-trimethoxybenzaldehyde
2,4,5-trimethoxybenzaldehyde
2,4,6-trimethoxybenzaldehyde
3,4,5-trimethoxybenzaldehyde
5-bromothiophene-2-carboxaldehyde
2-furaldehyde
5-methoxyindole-3-carboxaldehyde
5-methyl-2-furaldehyde
5-methylindole-3-carboxaldehyde
6-methyl-2-pyridinecarboxaldehyde
N-methylpyrrole-2-carbonoxaldehyde
3-methyl-2-thiophenecarboxaldehyde
5-methyl-2-thiophenecarboxaldehyde
2-pyridinecarboxaldehyde
3-pyridinecarboxaldehyde
4-pyridinecarboxaldehyde
pyrrole-2-carboxaldehyde
3,5-dichlorobenzaldehyde
2,4-dichlorobenzaldehyde
3,4-dichlorobenzaldehyde
4-[N,N-bis(ethyl)amino]-2-methylbenzaldehyde
2-chloro-5-nitrobenzaldehyde
2-chloro-6-nitrobenzaldehyde
2,4-dinitrobenzaldehyde
2,6-dinitrobenzaldehyde
2-acetamido-4-[N,N-bis(ethyl)amino]benzaldehyde
2-acetamido-4-[N,N-bis(ethyl)amino]-5-methoxybenzaldehyde
2-benzamido-4-[N,N-bis(ethyl)amino]benzaldehyde
3-cyanobenzaldehyde
indole-3-carboxaldehyde
thiophene-2-carboxaldehyde
quinoline-2-carboxaldehyde
4'-[N-(2-acetoxy-3-phenoxypropyl)-N-ethylamino]-2'-methylbenzaldehyde
4'-[N-(2-benzoyloxy-3-phenoxypropyl)-N-ethylamino]-2'-methylbenzaldehyde
2,5-dimethoxybenzaldehyde
2,4-dimethoxybenzaldehyde
3,4-dimethoxybenzaldehyde 2-fluorobenzaldehyde
3,5-dimethoxybenzaldehyde
2-trifluoromethylbenzaldehyde
4-[N-cyanoethyl-N-n-propylamino]benzaldehyde
4-[N,N-bis(isopropyl)amino]benzaldehyde
4-[N,N-bis(n-butyl)amino]benzaldehyde
4-[N,N-bis(n-butyl)amino]-2-methylbenzaldehyde
1-naphthaldehyde
2-naphthaldehyde
4-bromobenzaldehyde
4-[N,N-bis(methyl)amino]naphthaldehyde
4-[N,N-bis-(ethyl)amino]naphthaldehyde
4-[N-cyanoethyl-N-ethylamino]naphthaldehyde
4-[N-ethylamino]naphthaldehyde
4'-[N-ethyl-N-(2-phenylcarbamoyloxy-3-phenoxypropyl)amino]-2'-methylbenzaldehyde
4-[N-benzoyloxyethyl-N-ethylamino]benzaldehyde
4-[N-benzoyloxyethyl-N-cyanoethylamino]benzaldehyde
4-[N-cyanoethyl-N-propionyloxyethylamino]benzaldehyde
4-methoxybenzaldehyde
3-chlorobenzaldehyde
2-chlorobenzaldehyde
4-[N-cyanoethyl-N-ethylamino]benzaldehyde
2-chloro-4-[N,N-bis(ethyl)amino]benzaldehyde
2-chloro-4-[N,N-bis(methyl)amino]benzaldehyde
4'-[N,N-bis(2-chloroethyl)amino]benzaldehyde
4'-[N,N-bis(2-acetoxyethyl)amino]benzaldehyde
4'-[N,N-bis(2-acetoxyethyl)amino]-2'-benzamidobenzaldehyde
4'-[N,N-bis(2-butyroxyethyl)amino]benzaldehyde
4'-[N,N-bis(2-acetoxyethyl)amino]-2'-acetamidobenzaldehyde
4-[N-cyanoethyl-N-hydroxyethylamino]benzaldehyde
4-[N-cyanoethyl-N-phenethylamino]benzaldehyde
4'-[N,N-bis(2-valerylethyl)amino]benzaldehyde
4'-[N-cyanoethyl-N-(2-phenoxycarbonylethyl)amino]benzaldehyde
4'-[N-(2-acrylyloxyethyl)-N-cyanoethylamino]benzaldehyde
4'-[N-(2-butoxycarbonylethylamino]-2'-chlorobenzaldehyde
4'-[N-(2-methoxycarbonylethyl)amino]naphthaldehyde
4'-]N-(2-butoxycarbonylethyl)amino]naphthaldehyde
4-[N,N-bis(ethyl)amino]-2-ureidobenzaldehyde
4'-[N-benzyl-N-(3-cyanopropyl)amino]-2'-ureidobenzaldehyde
4'-{N-[2-(3-dimethylaminophenoxycarbonyl)ethyl]-N-ethylamino}benzaldehyde
4'-{N-[2-(3,5-dichlorophenoxycarbonyl)ethyl]amino}-benzaldehyde
2'-acetamido-4'-{N-[2-(4-methoxyphenoxycarbonyl)ethyl]amino}benzaldehyde
4'-{N-[2-(2-methyl-4-methoxyphenoxycarbonyl)ethyl]-N-methylamino}benzaldehyde
4'-{N-[2-(2-chlorobenzoyloxy)ethyl]-N-methylamino}benzaldehyde
4'-{N-ethyl-N-[2-(4-nitrobenzoyloxy)ethyl]amino}benzaldehyde
4'-{N-[2-(4-acetamidobenzoyloxy)ethyl]amino}benzaldehyde
2'-acetamido-4'-{N-[2-(2-chloro-4-nitrobenzoyloxy)-ethyl]-N-ethylamino}benzaldehyde
4'-{N-[3-(4-bromobenzoyloxy)propyl]amino}benzaldehyde
4'-{N-[2-(2-methyl-3-nitrobenzoyloxyethoxycarbonyl)ethyl]amino}benzaldehyde
4'-{N-[2-(4-methoxybenzoyloxyethoxycarbonyl)propyl]amino}benzaldehyde
4'-{N-[2-(3-cyanobenzoyloxyethoxycarbonyl)ethyl]amino}benzaldehyde
4'-{N-[2-(2-methylbenzoyloxyethoxycarbonyl)ethyl]amino}benzaldehyde
2'-chloro-4'-{N-[2-(propionyloxyethoxycarbonyl)-ethyl]amino}benzaldehyde
4'-{N,N-bis[2-(butyryloxyethoxycarbonyl)ethyl]amino}benzaldehyde 4'-{N-[2-(benzoyloxyethoxycarbonyl)ethyl]-N-methylamino}benzaldehyde
4-(N-cyanoethylamino)-3-n-butylbenzaldehyde
4'-[N,N-bis(ethyl)amino]-2'-(3-methoxypropionamido)benzaldehyde
2-acetamido-4-(N-cyanoethyl-N-ethylamino)benzaldehyde
2'-butyramido-4'-[N-cyanoethyl-N-(2-methoxycarbonylethyl)amino]benzaldehyde
2'-(3-chloropropionamido)-4'-[N-phenethyl-N-n-propylamino]benzaldehyde
2'-acetamido-4'-[N-(2-methoxycarbonylethyl)amino]5'-methoxybenzaldehyde
4'-[N,N-bis(ethyl)amino]-5'-methoxy-2'-(3-methylbenzamido)benzaldehyde
2'-chloroacetamido-4'-[N,N-bis(ethyl)amino]-5'-methoxybenzaldehyde
2'-(3-chlorobutyramido)-4'-[N,N-bis(cyanoethyl)amino]-5'-methoxybenzaldehyde
2'-acetamido-4'-[N,N-bis(2-acetoxyethoxycarbonylethyl)amino]-5'-methoxybenzaldehyde
4'-[N,N-bis(2-acetoxyethyl)amino]-2'-(2-chlorobenzamido)-5'-methoxybenzaldehyde
2'-acetamido-4'-[N-(2-acetoxyethyl)-N-cyanoethylamino]-5'-methoxybenzaldehyde
4'-[N-cyanoethyl-N-ethylamino]-5'-methoxy-2'-(4-nitrobenzamido)benzaldehyde
4'-[N-(2-methoxycarbonylethyl)-N-methylamino]benzaldehyde
4'-[N,N-bis(2-acetoxyethyl)amino]-2'-methylsulfonamidobenzaldehyde
4'-[N-(2-acetoxyethyl)-N-cyanoethylamino]-2'-phenylsufonamidobenzaldehyde
4'-[N,N-bis(2-acetoxyethyl)amino]-5'-methoxy-2'-methylsulfonamidobenzaldehyde
4'-[N-ethyl-N-(2-succinimidoethyl)amino]-2'-methylbenzaldehyde
4'-[N-ethyl-N-(2-phthalimidoethyl)amino]-2'-methylbenzaldehyde
4'-[N-cyanoethyl-N-(2-succinimidoethyl)amino]-2'-methylbenzaldehyde
4'-[N-ethyl-N-(2-glutarimidoethyl)amino]-2'-methylbenzaldehyde
6-formyl-N-(β-phenylcarbamoyloxyethyl)-2,2,4,7-tetramethyl-1,2,3,4-tetrahydroquinoline
6-formyl-N-cyanoethyl-2,2,4,7-tetramethyl-1,2,3,4-tetrahydroquinoline
6-formyl-N-(β-acetoxyethyl)-2,2,4,7-tetramethyl-1,2,3,4-tetrahydroquinoline
6-formyl-N-(β-benzoyloxyethyl)-2,2,4,7-tetramethyl-1,2,3,4-tetrahydroquinoline
4'-[N,N-bis(2-cyanoethylethoxyethyl)amino]-2'-methylbenzaldehyde
2'-acetamido-4'-[N-(2-cyanoethylethoxyethyl)-N-ethylamino]benzaldehyde
4'-[N-ethyl-N-(2-methylsulfonylethyl)amino]-2'-methylbenzaldehyde
4'-[N-cyanoethyl-N-(2-phenylsulfonylethyl)amino]benzaldehyde
4'-[N-cyanoethyl-N-(2-methoxyethylamino]benzaldehyde
4'-[N-ethyl-N-(2-propionoxyethyl)amino]-2'-methylbenzaldehyde
indole-2-carboxaldehyde
N-ethylindole-3-carboxaldehyde
N-(2-acetoxyethyl)indole-3-carboxaldehyde
thianaphthene-2-carboxaldehyde
thianaphthene-3-carboxaldehyde
4,5-dibromothiophene-2-carboxaldehyde
4-bromothiophene-2-carboxaldehyde
thiophene-3-carboxaldehyde
5-[N,N-bis(ethyl)amino]indole-3-carboxaldehyde
5-[N,N-bis(ethyl)amino]thiophene-2-carboxaldehyde
5-[N,N-bis(methyl)amino]-1,3,4-thiadiazole-2-carboxaldehyde
5-[N,N-bis(ethyl)amino]-1,4-thiazole-2-carboxaldehyde
4-bromofuran-2-carboxaldehyde
pyridine-N-oxide-3-carboxaldehyde The aldehydes listed above are either commercially available or can be prepared by well known prior art procedures, such as the Vilsmeier reaction using dimethylformamide, phosphorus oxychloride and the appropriate substituted aryl compound.

Further to the above, the aryl aldehydes can be modified by the incorporation of sulfonic acid groups ($SO_3H$) to provide, when condensed with diaminomaleonitrile as described herein, acid dyes for potential use on nylon. Similarly, incorporation of basic groups ($-N^+(alkyl)_3$) can provide cationic dyes having potential utility on polyacrylonitrile and acid-modified polyester and polyamide fibers.

The symmetrical dyes, that is, bisanil dyes of the above formula wherein $Ar_1$ and $Ar_2$ are the same, can be prepared in one step by condensing 1 mole of diaminomaleonitrile with 2 moles of an aryl aldehyde, in the presence of an acidic catalyst, in an organic solvent, at 50°–150°C., while continuously removing the water formed during the reaction either by azeotropic distillation or by the action of a dehydrating agent, such as phosphorus pentoxide or dicyclohexylcarbodiimide. Preferred catalysts in the condensation include sulfuric acid, polyphosphoric acid and p-toluenesulfonic acid. Organic solvents, such as acetonitrile, tetrahydrofuran, dimethylformamide, hexamethylphosphoramide, dimethylacetamide, toluene, xylene, benzene and monochlorobenzene are equally useful. After cooling the reaction mixture to room temperature, the precipitated bisanil dyestuff can be isolated by filtration.

It has been discovered that condensation of 2 moles of 4-[N,N-bis(ethyl)amino]benzaldehyde and 1 mole of diaminomaleonitrile at 50°–55°C. in -hexamethylphosphoramide containing sulfuric acid as catalyst, in the presence of phosphorus pentoxide to remove the water of reaction, over a 6 hour period, provides the bright, fluorescent, red cisbisanil dye N,N'-{4-[N,N-bis(ethyl)amino]benzylidene}diaminomaleonitrile having the structure

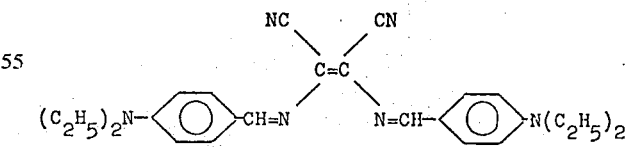

geometry about the central carbon-carbon double bond is evidenced by the large observed dipole moment (14.6 D) of this dye. This result correlates well with the large dipole moment (7.8 D) of diaminomaleonitrile as reported by Webb et al. in *J. Am. Chem. Soc.*, 77, 3491–3 (1955). Depending on the rotation of the amino groups, a much lower dipole moment is predicted for the trans configuration. In general, the cis-symmetrical bisanil dyes prepared by the aforementioned process undergo isomerization and/or partial hydrolysis upon attempted recrystallization from dimethylformamide, acetonitrile or nitromethane, yielding mixtures of the cis- and trans-symmetrical bisanils and the yellow monoanil species.

A useful one-step process for the preparation of symmetrical bisanil dyes involves the condensation of at least about 2 moles of aryl aldehyde with 1 mole of diaminomaleonitrile in glacial acetic acid, at about the boiling temperature of the acid, for extended periods of time. This process provides the thermodynamically more stable trans isomer having the structure

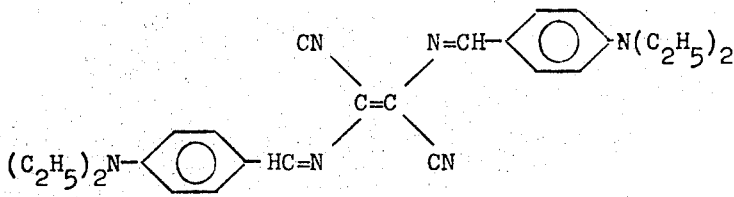

The low dipole moment of 3.2D on this product supports the structure assignment. Reaction times of up to about four hours at 115°–120°C. generally are adequate for obtaining substantially trans isomer. Upon cooling to room temperature, the trans-bisanil crystallizes and can be isolated from the acid medium. Yields of 60–75% of high purity symmetrical trans-bisanils can be obtained by this procedure. A similar result can be obtained by condensing 1 mole of the monoanil of diaminomaleonitrile with 1 mole of an aryl aldehyde under similar conditions to those described above.

The unsymmetrical bisanil dyes, that is, bisanil dyes prepared from diaminomaleonitrile and two different aldehydes, can be prepared in stepwise fashion by monocondensation of 1 mole of a first aryl aldehyde with 1 mole of diaminomaleonitrile to provide the yellow monoanil derivative. The monocondensation is preferably run in an organic solvent, such as tetrahydrofuran, acetonitrile or benzene, for up to about four hours, at the boiling point of the solvent, in the presence of an acidic catalyst, such as sulfuric acid. The resultant yellow monoanil (1mole) is then treated with 2moles of a different aryl aldehyde in an organic solvent in the presence of a secondary or tertiary amine catalyst, while azeotropically removing the water formed in the condensation. Preferred amine catalysts are piperidine and triethylenediamine. No condensation occurs in the absence of catalyst. Useful organic solvents include monochlorobenzene, acetonitrile, dimethylformamide, isopropanol, dichloroethane, toluene and benzene, the latter being most useful. By way of example of the stepwise condensation, diaminomaleonitrile (1mole) is condensed with 4-[N,N-bis(ethyl)amino]benzaldehyde (1 mole) in tetrahydrofuran, in the presence of sulfuric acid, at 60°–65°C., for 3 hours; a high yield, for example, 80–90%, of the yellow monoanil N-{4-[N,N-bis(ethyl)amino]benzylidine}diaminomaleonitrile is obtained. This intermediate monoanil possesses inherent deficiencies in application properties on polyester when compared to the bisanil. The monoanils, in general, also do not exhibit the fluorescence and brightness which are characteristic of the bisanil derivatives of diaminomaleonitrile. Subsequent condensation of the aforesaid monoanil (1 mole) with 2 moles of 4-chlorobenzaldehyde in benzene, in the presence of a catalytic amount of piperidine, at 75°–80°C., while continuously azeotroping water over a six-hour period, provides, after removal of solvent, a 40–50% yield of the trans-unsymmetrical bisanil N-{4-[N,N-bis(ethyl)amino]benzylidene}-N'-(4-chlorobenzylidene)-diaminomaleonitrile having the structure

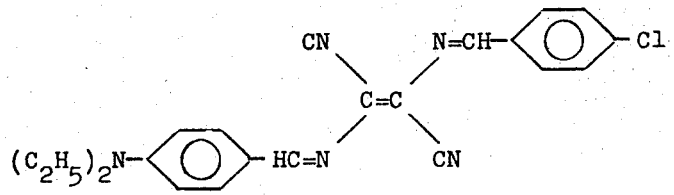

When the amount of basic catalyst is less than 0.50 mole per mole of monoanil, the trans-unsymmetrical dye is contaminated with the cis-unsymmetrical dye and both the cis and trans forms of the symmetrical adduct N,N'-{4-[N,N-bis(ethyl)amino]benzylidene}diaminomaleonitrile. The latter derivative is believed to be formed by initial hydrolysis of N-{4-[N,N-bis(ethyl)amino]benzylidene}-N'-(4-chlorobenzylidene)diaminomaleonitrile to N-(4-chlorobenzylidene)diaminomaleonitrile and 4-diethylaminobenzaldehyde, followed by subsequent reaction of the latter aldehyde with the starting monoanil N-{4-[N,N-bis(ethyl)amino]benzylidene}diaminomaleonitrile. The ratio of cis and trans products obtained does not change with longer reaction times, for example, up to about 18 hours. However, when the condensation is carried out with an increased amount of basic catalyst, for example, 0.50 mole of catalyst to one mole of monoanil, only the trans-symmetrical and trans-unsymmetrical bisanils are formed. Using larger amounts of aryl aldehyde, for example, greater than 2 moles per mole of monoanil, or using other solvents does not substantially alter the product.

The major drawback of the above-described two-step process for preparing unsymmetrical bisanils of diaminomaleonitrile is that, under the reaction conditions, the product mixtures contain both symmetrical and unsymmetrical dyes. Due to the plurality of prducts capable of being formed by this process, the trans-unsymmetrical dyes are generally obtained only in moderate yields and complex separation methods usually are necessary to effect satisfactory resolution of the product mixtures. An improved process (a preferred process herein) for the preparation of trans-unsymmetrical bisanil adducts of diaminomaleonitrile (the preferred adducts herein) is illustrated by the following general scheme:

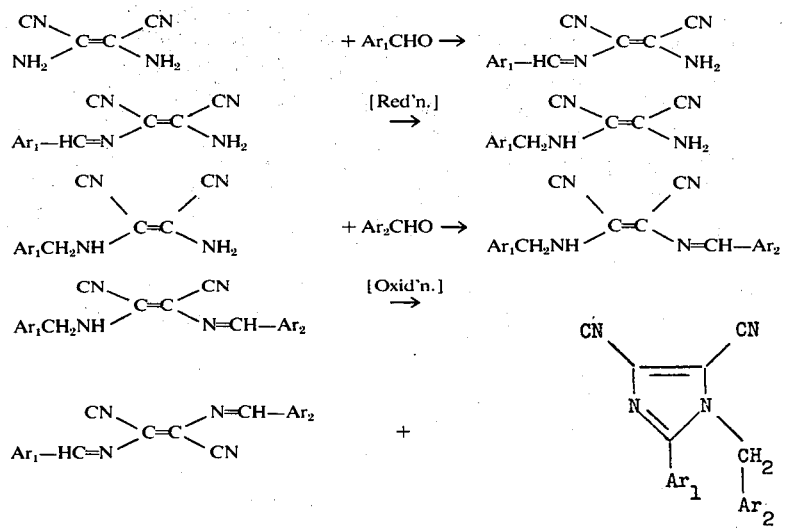

This four-step synthesis involves an initial condensation of 1 mole of diaminomaleonitrile with a first aryl aldehyde to give the monoanil adduct. In practice, any organic solvent can be used in this initial step, ketones and aldehydes which can react with diaminomaleonitrile being an exception. It is not necessary to have the diamonomaleonitrile in solution. Solvents which can be used in this condensation include tetrahydrofuran, ethyl "Cellosolve", dimethylformamide, methanol, ethanol and mixtures thereof. A useful temperature range is 20°–80°C.; however, a temperature of 25°–30°C. is preferred and provides the best yield and quality of product. Reaction times of about 4–17 hours can be employed. Acid catalysts, such as sulfuric acid, hydrochloric acid, p-toluenesulfonic acid and trifluoroacetic acid, can be used. The monoanil can either be isolated or the reaction mixture containing same can be used in the next step.

Reduction of the monoanil, for example, with sodium borohydride, gives the N-benzyldiaminomaleonitrile derivative in high yield. Reduction of the monoanil adduct is a critical feature of the improved process in that it precludes the formation of undesirable mixtures during the subsequent condensation with Ar$_2$CHO (as was the case with the abovedescribed two-step process). Preferably, an organic solvent is present during the reduction step; included among the preferred solvents are tetrahydrofuran, methanol, ethanol and ethyl Cellosolve, the latter being especially preferred. The addition of sodium borohydride provides an exothermic reaction and external cooling is necessary to keep the reaction temperature within the preferred 10–35°C. range. Above 35°C. the product obtained is of poor quality. The sodium borohydride normally can be added over a 20–40 minute period while still maintaining the temperature below 35°C. Other reducing agents, such as lithium aluminum hydride and lithium borohydride, can also be used. The amount of reducing agent should be at least 0.50 mole per mole of monoanil to obtain complete reduction. The reduced monadduct can be used without further purification in the next step of the reaction sequence. The reduction works best when at least some alcoholic solvent is present in the reaction mixture. Thus, the initial condensation of diaminomaleonitrile with Ar$_1$CHO in tetrahydrofuran (THF) to give the monoanil, as previously described, followed by addition of methanol to the THF reaction mass and reduction of the monoanil with sodium borohydride, provides high yields of reduced monoadduct. In addition, by carrying out the initial condensation reaction at 25°–30°C. rather than at or above the boiling point of tetrahydrofuran (65°–66°C.), for example, at 80°C., and by keeping the subsequent reduction temperature below 25°C., excellent yields, for example, greater than 90% of theory, of the reduced monoadduct can be obtained.

Condensation of 1 mole of the reduced monoadduct with 1 mole of a second aryl aldehyde Ar$_2$CHO provides the monoreduced bisadduct. This step can be carried out with the same solvents and acidic catalysts used in the initial monocondensation step. However, best results are obtained when a solvent such as methanol or ethanol is used. In such a solvent the monoreduced bisadduct is very insoluble and precipitates as formed. Room (ambient) temperature (25–30°C.) is preferred in this step for maximizing purity of product; higher temperatures cause the product to darken considerably.

In order to obtain bisanil dyes having a red shade it is necessary, in many cases, to have a dialkylamino group on at least one of the aromatic rings. It is preferred to add the appropriate dialkylaminobenzaldehyde as the second aryl aldehyde rather than as the first aryl aldehyde since the monoanil formed from such an aldehyde is, in some cases, not reduced cleanly by sodium borohydride.

Oxidation of the monoreduced bisadduct in the final step of the four-step process with an oxidizing agent in an organic solvent provides the desired unsymmetrical bisanil dye accompanied, in some cases, by the colorless isomeric 2,3-dicyanoimidazole as shown in the aforesaid equations. The oxidation proceeds readily in tetrahydrofuran, acetonitrile, benzene, ethyl Cellosolve and acetone. However, in these solvents a large amount of imidazole is usually formed. Preferred solvents which give the bisanil dye and little or none of the isomeric imidazole are dimethylformamide, dimethylacetamide, dimethylsulfoxide, hexamethylphosphoramide and N-methylpyrrolidone. Oxidation at room (ambient) temperature (25°–30°C.) is preferred over elevated temperatures. Oxidizing agents that can be used include the nickel oxides, MnO$_2$, PbO$_2$, I$_2$, NO$_2$, dichlorodicyanoquinone and chloranil. Manganese dioxide gives the best yield and purity of dye and is preferred. In particular, carrying out the reaction with manganese dioxide in dimethylformamide at 25°–30°C.

for about 4 hours provides an 80% yield of bisanil dye and the dye is completely free of the isomeric imidazole, The bisanil dyestuff can be conveniently isolated by adding tetrahydrofuran to the reaction mixture and filtering to remove insoluble manganese oxides, after which isopropanol is added to the filtrate and the precipitated solids are filtered off and washed with isopropanol; the precipitate is the desired bisanil dye.

Alternatively, in order to eliminate tetrahydrofuran from the above procedure, the reaction mass (after oxidation) is poured into water and, after acidification, hydrogen peroxide or sulfur dioxide is added thereto to dissolve the manganese oxides. The resultant mixture is then filtered and the crude dye thus obtained is washed thoroughly with isopropanol. The latter modification eliminates both the expensive tetrahydrofuran solvent and the tedious removal of the insoluble manganese salts, thus providing for a more economical process.

The geometry about the central carbon-carbon double bond of the bisanil prepared by the four-step process is exclusively trans as evidenced by measurement of the dipole moment. Thus, the preferred four-step process affords a high yield, for example, 70–80% overall from diaminomaleonitrile, of unsymmetrical trans-bisanil dyes uncontaminated with the cis isomer or the isomeric imidazole.

The symmetrical bisanil dyes previously discussed can also be prepared by the aforesaid four-step process but they are more advantageously prepared in good yield by the one-step process previously described.

As still another example of a process which can be employed herein is a two-step process by which can be prepared symmetrical or unsymmetrical bisanil dyes, and particularly such dyes which have a predominantly trans configuration. This process comprises heating diaminomaleonitrile in dimethylformamide under acidic conditions, preferably provided by sulfuric acid, with a molar equivalent of a first aryl aldehyde $Ar_1CHO$ to produce a monoanil and then, employing the monoanil thus produced in place of diaminomaleonitrile, repeating the procedure with a molar equivalent of either the first aryl aldehyde $Ar_1CHO$ or a second aryl aldehyde $Ar_2CHO$ that is different from the first aryl aldehyde to produce either the symmetrical or unsymmetrical bisanil dye. The reaction times are very short, usually 10–30 minutes, and water produced during the condensations need not be removed to facilitate formation of the desired product. Although dimethylformamide is the preferred aprotic solvent, other solvents are useful, for example, dimethylacetamide, hexamethylphosphoramide, dimethylsulfoxide and N-methylpyrrolidone. The condensations are carried out in a temperature range of 140°C. to the boiling point of the solvent. The preferred range is 140°–150°C. Acidic catalysts, other than sulfuric acid, which are useful in providing acidic conditions include hydrochloric acid, p-toluenesulfonic acid and trifluoroacetic acid.

Preferred symmetrical bisanil dyes herein include:

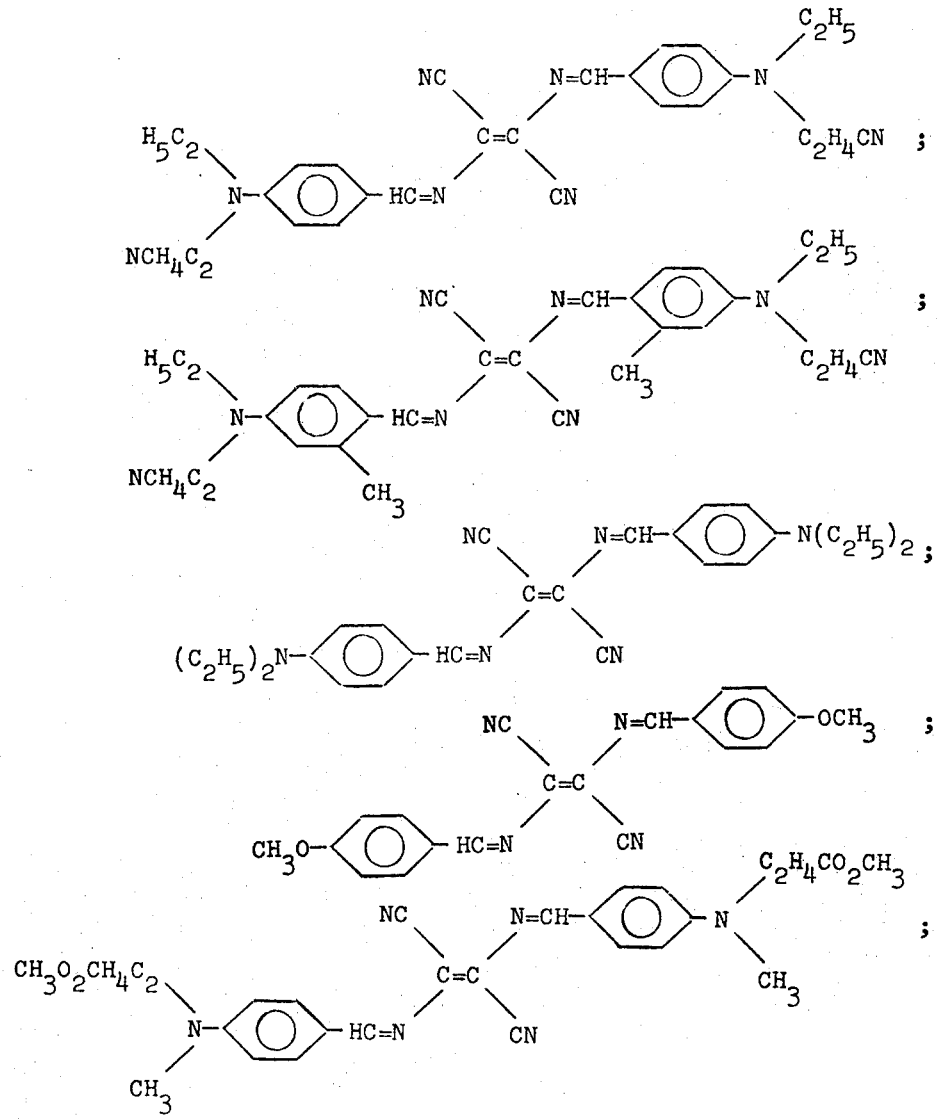

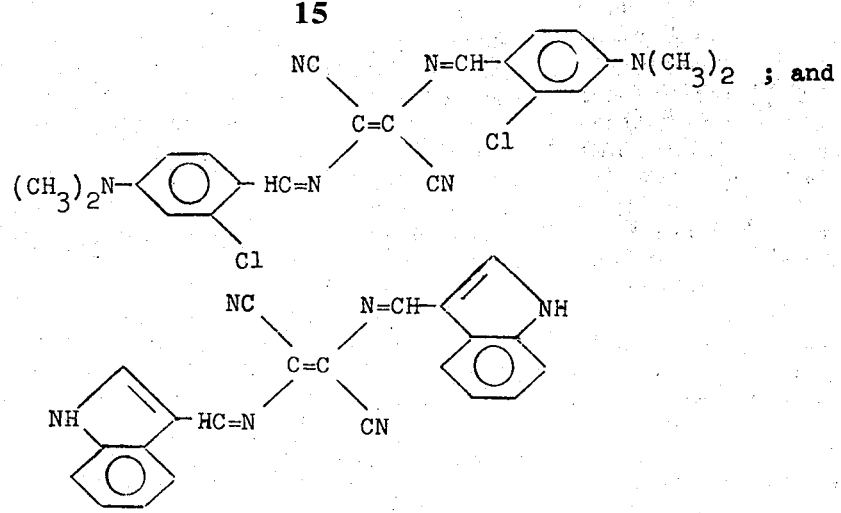
Preferred unsymmetrical bisanil dyes herein include:
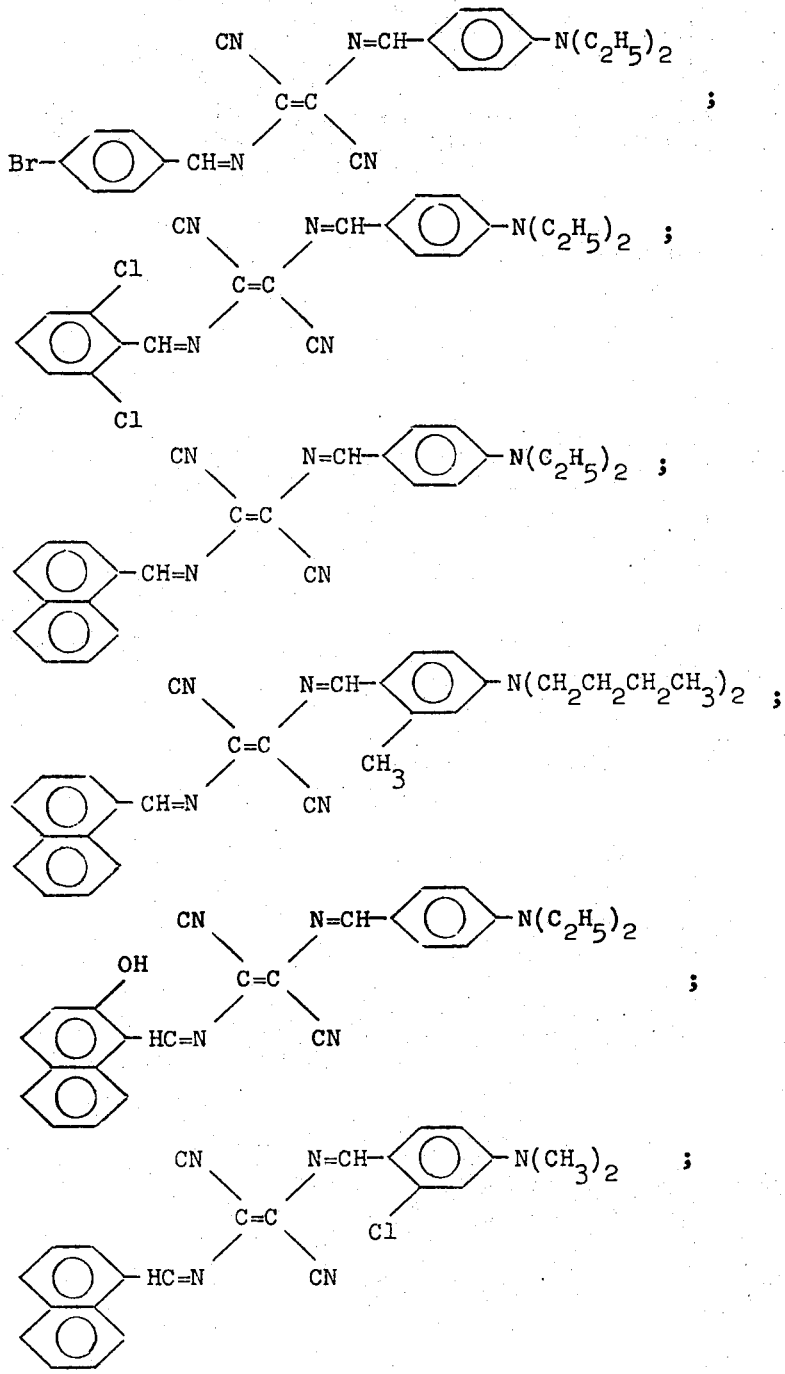

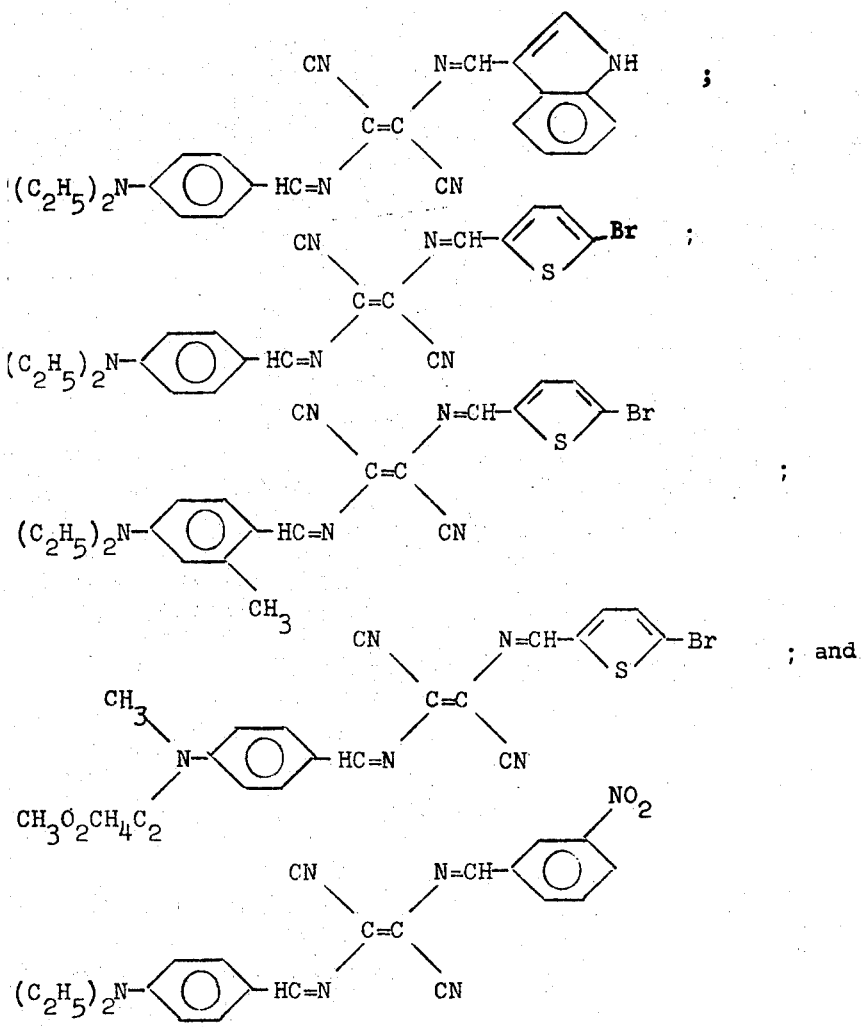

The crude wet dye from any of the above processes is conveniently converted into a commercially usable form by mixing the crude dye, for example, 10 parts on a 100% basis, with about 2.5 parts of a lignin sulfonate dispersant and water in a colloid or sand mill. Milling is continued until a fine, stable aqueous dispersion or paste is obtained, that is, until dye particle size is reduced to approximately one micron (average size).

Both the symmetrical and unsymmetrical bisanil dyes possess high tinctorial strengths and provide, on polyester, extremely bright, fluorescent yellow to blue dyeings having generally good fastness to sublimation and moderate fastness to light. These dyes are especially useful for dyeing and printing polyester where bright shades are desired. Because of the chemical versatility inherent in the preparative methods disclosed herein and becuase of the very high tinctorial strengths and breadth of shades obtainable, the bisanil dyes can be used in such a way as to suppress very undesirable coloration features without paying a color value penalty.

The bisanil dye can be applied to polyester fibers, either alone or in cellulosic blends, by an aqueous procedure, preferably under pressure, or by padding the fibers with an aqueous dispersion of the dye followed by dry heat (for example, Thermosol) fixation. Such dyeing procedures are widely used in the trade. The bisanil dyes are also useful for dyeing and printing polyester fibers, and their cellulosic blends, preferably employing a fabric which subsequently receives a durable press treatment.

The following experiments typify the aforementioned aqueous and Thermosol dyeing procedures.

EXPERIMENT 1

Aqueous (Pressure) Dyeing Procedure

Five grams of commercially available polyester fabric were placed in an autoclave containing:

| | |
|---|---|
| an aqueous dye paste (15% active ingredient) containing the dye of Example 4 | 0.1 gram |
| an anionic long chain sodium hydrocarbon sulfonate (10% solution) | 1.0 ml. |
| a nonionic long chain alcohol-ethylene oxide adduct (10% solution) | 0.5 ml. |
| ethylenediaminetetraacetic acid, sodium salt (1% solution) | 1.25 ml. |
| butyl benzoate carrier (10% solution) | 1.5 ml. |
| water | to 75 ml. |
| acetic acid | to adjust the pH to 5.5 |

The contents of the autoclave were heated for 1 hour at 265°C. The dyed fabric was then rinsed in water and dried. The polyester fabric was dyed an extremely bright, fluorescent red shade.

EXPERIMENT 2

Thermosol Procedure

A pad bath was prepared containing:

| | |
|---|---|
| an aqueous dye paste (15% active ingredient) containing the dye of Example 5 | 50 grams |
| purified natural gum thickener | 20 grams |
| water | to 1 liter |

The pad bath was padded on commercially available 65/35 polyester/cotton fabric with a pickup of 50–65%, based on dry fabric weight (owf), followed by drying (infrared predrying followed by hot air or hot can drying is preferable) to remove the water. Thermosoling, by which the polyester component was dyed with the disperse dye, was accomplished by heating the dried pigment-padded fabric for 90 seconds at 213°C. Unfixed surface dye, on either the polyester or the cotton or both, was removed by padding the fabric from an aqueous bath containing 50 g./l. of sodium hydroxide and 40 g./l. of sodium hydrosulfite at 27°–29°C., followed by steaming for 30 seconds. The fabric was then rinsed in water at 27°C., scoured for 5 minutes at 93°C. in water containing 1% ether alcohol sulfate detergent, rinsed in water at 27°C. and then dried. After dyeing and cleaning, the material was then padded (for permanent press treatment) with a pickup of 50–65% (owf) with a bath containing:

|  | g./l. |
|---|---|
| a dimethyloldihydroxyethyleneurea cross-linking agent | 200.0 |
| a p-octylphenoxy($C_2H_4O)_{9-10}$H wetting agent | 2.5 |
| a dispersed acrylic thermoplastic binding agent | 22.5 |
| a nonionic, paraffin-free, polyethylene emulsion which serves as a fabric softener | 22.5 |
| a nonionic polymer emulsion which imparts luster, a silky hand and antistatic properties to the fiber | 30.0 |
| a 20% aqueous zinc nitrate curing catalyst | 36.0 |

The resin-impregnated material was air dried to remove the water and then cured at 163°C. for 15 minutes. The durable-press treated polyester/cotton fabric was dyed an attractive, bright, fluorescent scarlet shade.

The following examples are given to illustrate the preparation of the bisanil dyes described above. All parts are given by weight unless otherwise noted.

EXAMPLE 1

Preparation of Symmetrical Bisanil

A mixture of 2.16 parts of diaminomaleonitrile, 9.16 parts of 4-[N,N-bis(cyanoethyl)amino]benzaldehyde, 0.2 part of p-toluenesulfonic acid, 30 parts of dimethylacetamide (DMAC) and 150 parts of benzene was heated at 80°–90°C. while benzene plus water was removed by distillation. After distillation for 17 hours, the remaining benzene was removed by distillation under nitrogen. After cooling the DMAC solution to −5°C. 4.2 parts of red bisanil were collected by filtration; its m.p. was 218°–220°C. Thin layer chromatography on silica gel-coated plates using benzene-acetonitrile (4:1) as eluent showed one scarlet spot at an $R_f$ of < 0.1.

Calc'd. for $C_{30}H_{26}N_{10}$: C, 68.6; H, 5.0; N, 26.5%.
Found: C, 68.2; H, 5.4; N, 26.5%.

An infrared spectrum of a Nujol mull of the product showed no N—H absorption at 2.8–3.1 $\mu$. Based on the above, the product was of the structure p—(NCH$_4$C$_2$)$_2$N—C$_6$H$_4$—CH=N—C(CN)=C(CN)—N=CH—C$_6$H$_4$—p—N(C$_2$H$_4$CN)$_2$ The mother liquor from the aforesaid filtration was poured into a large volume of ice-cooled water and the precipitated solids were isolated by filtration, washed with water and dried to give 3.9 parts of a red solid, m.p. 185°–186°C. Thin layer chromatography showed the presence of a minor scarlet spot at an $R_f$ of < 0.1 and a major yellow spot at an $R_f$ of 0.6. The product showed absorption bands at 515 m$\mu$ ($a_{max}$ of 10 liters g.$^{-1}$cm.$^{-1}$) for the bisanil and at 410 m$\mu$ ($a_{max}$ of 87 liters g.$^{-1}$cm.$^{-1}$) for the monoanil formed by hydrolysis of the bisanil during the DMF treatment.

Cal'd. for $C_{30}H_{26}N_{10}$: C, 68.6; H, 5.0; N, 26.5%.
Found: C, 67.0; H, 5.7; N, 29.5%.

Thus, hydrolysis of the bisanil occurred to provide a mixture comprising a preponderance of the monoanil and a minor amount of the bisanil.

EXAMPLE 2

Preparation of Symmetrical Bisanil

A mixture of 3.24 parts of diaminomaleonitrile, 10.6 parts of 4-[N,N-bis(ethyl)amino]benzaldehyde and 50 parts of glacial acetic acid was stirred at 115°–120°C. for 4 hours. After standing at 25°–30°C. for 18 hours, the solids were collected, washed with 25 parts of cold acetic acid, then with two 25-part portions of isopropanol and dried to give 5.3 parts (60.8% yield) of the symmetrical bisanil dye as dark blue metallic flakes, m.p. 268°–270°C. The dye had an absorptivity ($a_{max}$) of 265 liters g.$^{-1}$cm.$^{-1}$ at a wavelength ($\lambda_{max}$) of 561 m$\mu$. Based on the above, the dye was of the structure

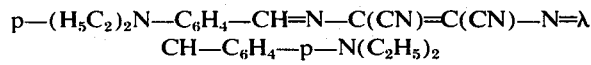

p—($H_5C_2$)$_2$N—$C_6H_4$—CH=N—C(CN)=C(CN)—N=CH—$C_6H_4$—p—N($C_2H_5$)$_2$

A similar result was obtained by starting with the appropriate monoanil derivative instead of diaminomaleonitrile.

EXAMPLE 3

Preparation of Unsymmetrical Bisanil by a Two-Step Process a. A mixture of 132 parts of diaminomaleonitrile, 210 parts of 4-[N,N-bis(ethyl)amino]benzaldehyde, 30 drops of concentrated sulfuric acid and 2,000 parts of tetrahydrofuran (THF) was heated at 65°C. for 3 hours. The tetrahydrofuran was partially evaporated and 1,000 parts of ethanol were added. The precipitated solids where isolated by filtration and air dried to give 227 parts of yellow monanil (76% yield). A mixture of 14.1 parts of 4-chlorobenzaldehyde, 20 drops of piperidine and 500 parts of benzene was heated at 80°–90°C. while continuously azeotroping the water formed during the reaction. The monoanil (13.4 parts) was then added in portions over a 6-hour period and heating at 80°–90°C. was continued for an additional 2 hours. The solvent was removed by distillation and the resultant solid residue was boiled with 200 parts of isopropanol. After filtration and drying, 9.2 parts (47% yield) of red product were obtained, m.p. 207°–208°C. Thin layer chromatography showed the major component to be the unsymmetrical dye along with small amounts of purple impurities. The dye had an absorptivity ($a_{max}$) of 177 liters g.$^{-1}$cm.$^{-1}$ at a wavelength ($\lambda_{max}$) of 528 m$\mu$.

Calc'd. for $C_{22}H_{20}N_5Cl$: C, 67.8; H, 5.2; N, 18.0%.
Found: C, 68.6; H, 5.6; N, 17.9%.

Based on the above, the dye was of the structure

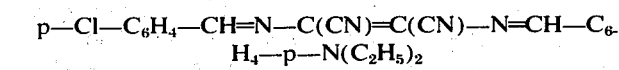

p—Cl—$C_6H_4$—CH=N—C(CN)=C(CN)—N=CH—$C_6H_4$—p—N($C_2H_5$)$_2$ b. A mixture of 6.7 parts of the monoanil of part (a), 7.05 parts of 4-chlorobenzaldehyde, 0.85 part of piperidine and 250 parts of benzene was heated at 80°–90°C. for 1 hour while continuously azeotroping the water formed during the reaction. Thin layer chromatography of the reaction mixture showed the presence of approximately equal amounts of the trans-symmetrical and -unsymmetrical bisanil dyes; only traces of cis-bisanil dyes could be detected.

c. When the condensation was run on the same scale but in the presence of only 1 drop of piperidine, the major products after 1 hour at 80°–90°C. were the cis-symmetrical and -unsymmetrical bisanil dyes. Only traces of trans-bisanil dyes were present.

EXAMPLE 4

Preparation of Unsymmetrical Bisanil by a Four-Step Process

A mixture of 21.6 parts of diaminomaleonitrile, 38.3 parts of 4-bromobenzaldehyde, 5 drops of concentrated sulfuric acid and 250 parts of tetrahydrofuran was stirred at 25°–30°C. for 4 hours. Methanol (100 parts) was added and 7.95 parts of sodium borohydride were added in portions over a 20-minute period while maintaining the temperature at 20°–25°C. by external cooling in ice water. After stirring for 15 minutes at 20°–25°C. most of the solvent was removed by distillation. The remaining solution was poured into 1,500 parts of ice-cooled water and stirred for 1 hour; the resultant solids were collected and air dried to give 53.5 parts (97% yield) of the reduced monoadduct. This material was used in the next step of the reaction sequence without purification.

A slurry of 53 parts of the reduced monoadduct, 38.8 parts of 4-[N,N-bis(ethyl)amino]benzaldehyde, 1.2 parts of concentrated sulfuric acid and 1,000 parts of ethanol was stirred for 4 hours at 25°–30°C. The reaction mixture was filtered and the collected solids were air dried, yielding 83 parts (99% yield) of orange reduced bisadduct. This product was of sufficient purity to use in the next reaction without purification.

A mixture of 82 parts of the reduced bisadduct, 75 parts of manganese dioxide and 500 parts of dimethylformamide was stirred for 4 hours at 25°–30°C. Tetrahydrofuran (500 parts) was added and the resulting mixture was filtered through a medium porosity, sintered glass funnel. The solids thus obtained were washed with four 400-part portions of tetrahydrofuran to dissolve and separate the precipitated bisanil dye from the insoluble manganese oxides. The combined tetrahydrofuran filtrates were concentrated under reduced pressure to a thick slush, 600 parts of isopropanol were added and the resultant slurry was filtered; the collected solids were washed with three 100-part portions of isopropanol to give 61.5 parts (75.6% yield) of bisanil dye, as metallic green flakes, exhibiting an absorptivity ($a_{max.}$) of 153 liters g.$^{-1}$cm.$^{-1}$ at a wavelength ($\lambda_{max.}$) of 531 m$\mu$. Recrystallization of the product from benzene gave very dark needles, m.p. 205°–206°C.; it exhibited an $a_{max.}$ of 166 liters g.$^{-1}$cm.$^{-1}$ at a $\lambda_{max.}$ of 531 m$\mu$.

Calc'd. for $C_{22}H_{20}N_5Br$: C, 60.8; H, 4.7; N, 16.1%.
Found: C, 59.5; H, 4.8; N, 15.6%.

Thin layer chromatographic analysis of the product showed only a single purple spot. Based on the above, the dye was of the structure p—Br—$C_6H_4$—CH=N—C(CN)=C(CN)—N=CH—$C_6H_4$—p—N($C_2H_5$)$_2$

EXAMPLE 5

Preparation of Unsymmetrical Bisanil by a Four-Step Process

A mixture of 10.8 parts of diaminomaleonitrile, 15.6 parts of 1-naphthaldehyde, 5 drops of concentrated sulfuric acid and 125 parts of tetrahydrofuran was stirred at 25°–30°C. for 17 hours. Methanol (35 parts) was added and the solution was cooled to 15°C. Sodium borohydride (3.8 parts) was added in portions while maintaining the temperature between 15°–20°C. by external water-ice cooling. After stirring for 15 minutes, the solution was poured into 1,500 parts of ice-cooled water and stirred for 3 hours; the solids (the reduced monoadduct as a light tan powder) were removed by filtration.

A slurry of the reduced monoadduct, 18 parts of 4-[N,N-bis(ethyl)amino]benzaldehyde, 15 drops of concentrated sulfuric acid and 200 parts of ethanol was stirred for 17 hours at 25°–30°C. The solids were isolated by filtration, yielding 35.4 parts of the reduced bisadduct as an orange powder.

A mixture of the reduced bisadduct, 35 parts of manganese dioxide and 150 parts of dimethylformamide was stirred for 5 hours at 25°–30°C. The solids were isolated by filtration and washed with four 400-part portions of tetrahydrofuran to give a solution of the desired bisanil dye. The tetrahydrofuran and dimethylformamide were distilled off under reduced pressure and the solids thus obtained were washed with isopropanol and dried, yielding 32.5 parts (80% yield) of bisanil dye as a dark red powder, m.p. 211°–213°C.; it exhibited an absorptivity ($a_{max.}$) of 183 liters g.$^{-1}$cm.$^{-1}$ at a wavelength ($\lambda_{max.}$) of 540 m$\mu$.

Calc'd. for $C_{26}H_{23}N_5$: C, 77.0; H, 5.7; N, 17.3%.
Found: C, 76.3; H, 5.6; N, 17.4%.

Thin layer chromatography showed only a single purple spot. Based on the above, the dye was of the structure

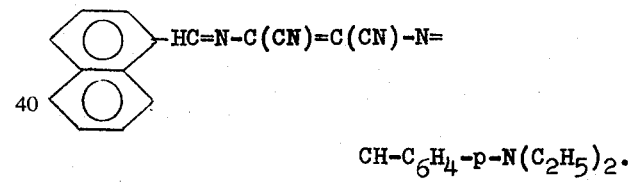

$CH-C_6H_4-p-N(C_2H_5)_2$.

EXAMPLE 6

Preparation of Unsymmetrical Bisanil by a Four-Step Process

Example 5 was substantially repeated except that another solvent was used in place of tetrahydrofuran in both the reduction and oxidation steps. To a slurry of 12.7 parts of the monoanil of Example 5 in 50 parts of ethyl Cellosolve was added in portions, 0.95 part of sodium borohydride while maintaining the temperature at 25°–35°C. by external cooling in ice-cooled water. The resulting solution was stirred for 30 minutes, poured into 500 parts of ice water and stirred for 1 additional hour. The light tan precipitate was collected by filtration and air dried to give 12.4 parts (100% yield) of reduced monoadduct.

The reduced monoadduct was condensed with 4-[N,N-bis(ethyl)amino]benzaldehyde in ethanol as described in Example 5 to yield the reduced bisadduct.

A mixture of 5.0 parts of the reduced bisadduct, 5.0 parts of manganese dioxide and 35 parts of dimethylformamide was stirred for 2 hours at 25°–30°C. The solution was poured into 350 parts of ice-cooled water and 9 parts of concentrated sulfuric acid were added. Hydrogen peroxide (6 parts of a 30% aqueous solution) was added in portions to dissolve the manganese oxides. The resulting mixture was filtered and the crude dye thus obtained was washed with two 50-part portions of isopropanol and dried to give 4.5 parts (89.4% yield) of the bisanil dye, as a red solid, exhibiting an absorptivity ($a_{max}$) of 169 liters g.$^{-1}$cm.$^{-1}$ at a wavelength ($\lambda_{max}$) of 540 m$\mu$. Thin layer chromatography showed only a single purple spot; the $R_f$ was identical to that of the dye of Example 5.

EXAMPLE 7

Preparation of Unsymmetrical Bisanil by a Four-Step Process

The dye of Example 4 was also prepared by reaction of the reduced bisadduct (9.6 parts) with 10.6 parts of lead dioxide (0.04 mole) in 200 parts of acetonitrile at 50°–55°C. for 9 hours. The suspended lead sludge was filtered off and the solvent was evaporated. Thin layer chromatography showed the residue to consist of approximately equal amounts of the unsymmetrical bisanil dye of Example 4 and the colorless isomeric imidazole. The imidazole was removed by prolonged extraction of the solid with hot (80°–90°C.) ethanol; the extracted product was shown by thin layer chromatography to consist of a single purple spot. The analytical data obtained on the product was substantially the same as that reported in Example 4.

EXAMPLE 8

Preparation of Symmetrical Bisanil

A mixture of 9.4 parts of 4-[N,N-bis(ethyl)amino]-benzaldehyde, 2.16 parts of diaminomaleonitrile, 4.0 parts of phosphorus pentoxide, 6 drops of concentrated sulfuric acid and 70 parts of hexamethylphosphoramide was stirred at 50°–55°C. for 6 hours. After each 2-hour period, an additional 1.0 part of phosphorus pentoxide was added. The reaction mixture was then poured into 800 parts of water containing 20 parts of aqueous ammonium hydroxide. After stirring for 1 hour, the precipitated solids were collected by filtration, washed with water and dried to yield 5.5 parts (65% yield) of symmetrical bluish-red bisanil, m.p. 140°–142°C. The product was recrystallized three times from isopropanol, providing an analytically pure sample, m.p. 162°–165°C. The product exhibited a high intensity absorption band (105 liters g.$^{-1}$cm.$^{-1}$) at a wavelength of 558 m$\mu$ and, in addition, two lower intensity bands at 400 m$\mu$ (61.5 liters g.$^{-1}$cm.$^{-1}$) and 382 m$\mu$ (56 liters g.$^{-1}$ cm.$^{-1}$). Based on the presence of the lower wavelength absorption bands and the large observed dipole moment of 14.6 Debye, the product was confirmed as having cis geometry about the central carbon-carbon double bond. Based on the above, the structure is p—(H$_5$C$_2$)$_2$N—C$_6$H$_4$—CH=N—C(CN)=C(CN)—N=λCH—C$_6$H$_4$—p—N(C$_2$H$_5$)$_2$

EXAMPLE 9

Preparation of Symmetrical Bisanil

A mixture of 10.8 parts of diaminomaleonitrile, 29.0 parts of indole-3-carboxaldehyde, 400 parts of tetrahydrofuran and 10 drops of concentrated sulfuric acid was stirred at 65°C. for 16 hours. The tetrahydrofuran was partially evaporated and 10 parts of 10% aqueous sodium carbonate were added. The precipitated solids were isolated by filtration, washed with water, then with isopropanol and dried to give 20.3 parts of yellow monoanil (86% yield), m.p. 227.5°–229°C.

A mixture of 14.1 parts of the monoanil, 12.0 parts of concentrated sulfuric acid, 11.6 parts of indole-3-carboxaldehyde and 150 parts of dimethylformamide was heated in about 10 minutes to 145°–150°C.; it was maintained at this temperature for 20 minutes. The reaction mixture was then poured into 1,000 parts of water. The precipitated solids were collected by filtration, washed with water, then with isopropanol and dried. The product was recrystallized three times from acetonitrile-chloroform to give 6.85 parts (31.7% yield) of the symmetrical yellow bisanil, m.p. 331°–333°C. The dye had an absorptivity ($a_{max}$) of 220 liters g.$^{-1}$cm.$^{-1}$ at a wavelength ($\lambda_{max}$) of 480 m$\mu$.

Calc'd. for C$_{22}$H$_{14}$N$_6$: C, 72.9; H, 3.9; N, 23.2%. Found: C, 71.4; H, 4.3; N, 22.3%.

Based on the above, the structure of the dye is

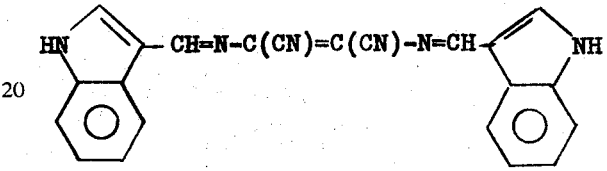

EXAMPLE 10

Preparation of Unsymmetrical Bisanil

A mixture of 4.7 parts of indole-3-carboxaldehydediaminomaleonitrile monoanil, 3.54 parts of 4-[N,N-bis(ethyl)amino]benzaldehyde, 4.0 parts of concentrated sulfuric acid and 50 parts of dimethylformamide was heated at 145°–150°C. for 20 minutes. The reaction mixture was then poured into 1,000 parts of water. The precipitated solids were filtered off, washed with water and dried. Thin layer chromatographic analysis showed the presence of the two possible symmetrical bisanil condensates, together with a third bright reddish-orange component. The latter material was isolated from the product mixture by column chromatography on "Florisil" using chloroform as eluent. After two recrystallizations from acetonitrile, a small amount (0.10 part) of the pure unsymmetrical bisanil condensate was obtained, m.p. 265°–268°C. Infrared analysis showed an NH band at 3395 cm.$^{-1}$ and CN absorption at 2200 cm.$^{-1}$ and 660 cm.$^{-1}$. The visible absorption spectrum exhibited a$\lambda_{max}$ of 522 m$\mu$ and an $a_{max}$ of 239 liters g.$^{-1}$cm.$^{-1}$. Based on the above, the structure of the dye is

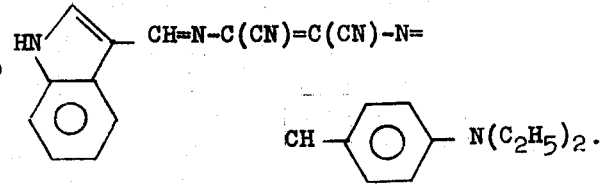

EXAMPLE 11

Preparation of Symmetrical Bisanil

A mixture of 2.16 parts of diaminomaleonitrile, 3.5 parts of 4-[N,N-bis(ethyl)amino]benzaldehyde, 8.0 parts of concentrated sulfuric acid and 50 parts of dimethylformamide was stirred at 145°–150°C. for 20 minutes. The reaction mixture was then poured into 1,000 parts of water; the precipitated solids were collected by filtration, washed with water and dried. The product was purified by column chromatography on Florisil using chloroform as eluent, yielding 0.47 part of bluish-red bisanil, m.p. 265°–268°C. It exhibited an absorptivity ($a_{max}$) of 265 liters g.$^{-1}$cm$^{-1}$ at a wavelength of 561 m$\mu$. A nuclear magnetic resonance (NMR)

spectrum of the product was found to be identical to that of the dye of Example 8. However, the absence of any lower wavelength absorption, together with the much higher melting point and a low observed dipole moment of 3.2 Debye indicates that the product is actually the trans form of the dye of Example 8.

The isomerization of the cis dye of Example 8 to the trans form of this example was readily effected by heating the former dye in benzene containing a small amount of iodine. The resultant product was identical in m.p. and spectral properties to the trans isomer.

EXAMPLES 12–118 Y

Symmetrical bisanil dyes were prepared (Examples 12–19) by procedures similar to that described in Example 2. Unsymmetrical bisanil dyes were prepared (Examples 20–118) by preferred four-step processes similar to those described in Examples 4 and 5. Data for the dyes produced are shown in Table II. Except as noted below the substituents A, B, C, X, Y and Z appearing as column headings in the table correspond to the substituents shown in the formula

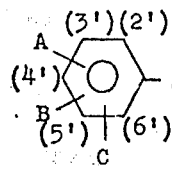 CH=N-C(CN)=C(CN)-N=CH 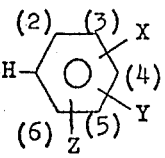

The groups shown in column Y for Examples 34, 39, 82, 87, 88 and 95 correspond to the entire group

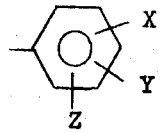

Similarly, the groups shown in column B for Examples 27, 31, 49, 50, 52, 53, 55, 61, 62, 63, 65, 66, 70, 76, 78–83, 89–99 and 118 correspond to the entire group

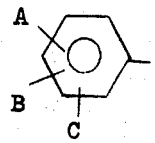

TABLE II

| Example No. | A | B | C | X | Y | Z |
|---|---|---|---|---|---|---|
| 12 | H | H | H | H | H | H |
| 13 | H | (4')-N(n-C₃H₇)₂ | H | H | (4)-N(n-C₃H₇)₂ | H |
| 14 | H | (4')-OCH₃ | H | H | (4)-OCH₃ | H |
| 15 | (2')-OCH₃ | (4')-OCH₃ | H | (2)-OCH₃ | (4)-OCH₃ | H |
| 16 | H | (4')-N(C₂H₅)-C₂H₄CN | H | H | (4)-N(C₂H₅)C₂H₄CN | H |
| 17 | (2')-CH₃ | (4')-N(C₂H₅)-C₂H₄CN | H | (2)-CH₃ | (4)-N(C₂H₅)C₂H₄CN | H |
| 18 | (2')-Cl | (4')-N(CH₃)₂ | H | (2)-Cl | (4)-N(CH₃)₂ | H |
| 19 | H | (40')-N(CH₃)-C₂H₄CO₂CH₃ | H | H | (4)-N(CH₃)C₂H₄CO₂CH₃ | H |
| 20 | H | H | H | H | (4)-N(CH₃)C₂H₄CN | H |
| 21 | H | (4')-Cl | H | H | (4)-N(CH₃)C₂H₄CN | H |

| Example No. | λ max. (mμ) | ε max. (l.g.⁻¹cm.⁻¹) | Shade on Polyester | Calculated C | Calculated H | Calculated N | Found C | Found H | Found N |
|---|---|---|---|---|---|---|---|---|---|
| 12 | 432 | — | yellow | 58.4 | 7.4 | 34.2 | 57.9 | 6.8 | 34.5 |
| 13 | 561 | 205 | Bluish Red | 74.5 | 7.9 | 17.6 | 73.6 | 7.2 | 17.7 |
| 14 | 427 | 159 | Greenish Yellow | 69.8 | 4.7 | 16.3 | 69.3 | 4.8 | 15.1 |
| 15 | 460 | 170 | Yellow | — | — | — | — | — | — |
| 16 | 540 | 215 | Red | 70.6 | 5.9 | 23.5 | 70.2 | 6.0 | 22.6 |
| 17 | 550 | 171 | Bluish Red | 71.4 | 6.4 | 22.5 | 71.7 | 6.7 | 21.9 |
| 18 | 555 | 223 | Bluish Red | 60.2 | 4.6 | 19.1 | 60.3 | 4.7 | 19.5 |
| 19 | 543 | 194 | Red | 65.4 | 5.9 | 16.3 | 64.2 | 5.4 | 16.0 |
| 20 | 500 | 141 | Bright Orange | 72.1 | 4.9 | 22.9 | 72.0 | 4.9 | 22.9 |
| 21 | 510 | 168 | Orange | 65.9 | 4.2 | 21.0 | 64.7 | 4.1 | 21.2 |

| Example No. | A | B | C | X | Y | Z |
|---|---|---|---|---|---|---|
| 22 | (2')-Cl | H | (6')-Cl | H | (4)-N(CH₃)C₂H₄CN | H |
| 23 | (2')-NO₂ | H | H | H | (4)-N(CH₃)C₂H₄CN | H |
| 24 | H | (4')-NO₂ | H | H | (4)-N(CH₃)C₂H₄CN | H |
| 25 | H | H | H | H | (4)-N(C₂H₅)₂ | H |
| 26 | H | H | H | (2)-OH | (4)-N(C₂H₅)₂ | H |
| 27 | — | 2-furyl | — | H | (4)-N(C₂H₅)₂ | H |
| 28 | (2')-OH | H | H | H | (4)-N(C₂H₅)₂ | H |
| 29 | H | H | H | (2)-CH₃ | (4)-N(C₂H₅)C₂H₄CN | H |
| 30 | H | H | H | H | (4)-N(C₂H₄CN)₂ | H |
| 31 | — | 2-furyl | — | H | (4)-N(C₂H₄CN)C₂H₄OCOC₆H₅ | H |

TABLE II-continued

| Example No. | λ max. (mμ) | α max. (l.g.⁻¹cm.⁻¹) | Shade on Polyester | Calculated C | H | N | Found C | H | N |
|---|---|---|---|---|---|---|---|---|---|
| 22 | 514 | 135 | Orange | 60.6 | 3.7 | 19.3 | 61.0 | 3.6 | 18.9 |
| 23 | 512 | 115 | Orange | 64.1 | 4.1 | 23.8 | 63.5 | 4.0 | 22.7 |
| 24 | 530 | 135 | Bright Red | 64.2 | 4.2 | 23.8 | 63.4 | 4.4 | 22.3 |
| 25 | 525 | 195 | Red | 74.3 | 6.0 | 19.7 | 74.5 | 6.2 | 19.5 |
| 26 | 527 | 176 | Bright Red | 71.2 | 5.7 | 18.8 | 66.8 | 5.2 | 17.1 |
| 27 | 530 | 208 | Red | 69.6 | 5.5 | 20.3 | 68.5 | 5.1 | 19.6 |
| 28 | 531 | 186 | Bright Red | 71.1 | 5.7 | 19.0 | 67.8 | 6.2 | 17.6 |
| 29 | 510 | 138 | Bright Orange | 73.1 | 5.6 | 21.3 | 69.9 | 5.0 | 19.9 |
| 30 | 488 | 152 | Yellow | 71.0 | 4.7 | 24.3 | 72.5 | 4.7 | 24.2 |
| 31 | 500 | 118 | Orange | 68.5 | 4.5 | 17.1 | 67.8 | 4.1 | 16.9 |

| Example No. | A | B | C | X | Y | Z |
|---|---|---|---|---|---|---|
| 32 | (2')-NO$_2$ | H | H | H | (4)-N(C$_2$H$_5$)$_2$ | H |
| 33 | (2')-Cl | H | (6')-Cl | H | (4)-N(C$_2$H$_5$)$_2$ | H |
| 34 | H | H | H | — | 4-N,N-dimethyl-amino-1-naphthyl | — |
| 35 | H | (4')-NO$_2$ | H | H | (4)-N(C$_2$H$_5$)$_2$ | H |
| 36 | H | H | H | (2)-CH$_3$ | (4)—N(C$_2$H$_5$)CH$_2$CH—CH$_2$OC$_6$H$_5$ $\qquad$ OCONHC$_6$H$_5$ | H |
| 37 | H | (4')-Cl | H | H | (4)-N(C$_2$H$_5$)C$_2$H$_4$-OCOC$_6$H$_5$ | H |
| 38 | (2')-Cl | H | H | H | (4)-N(C$_2$H$_5$)$_2$ | H |
| 39 | (2')-Cl | H | (6')-Cl | — | 3-indolyl | — |
| 40 | H | (3')-Cl | H | (2)-CH$_3$ | (4)-N(C$_2$H$_5$)C$_2$H$_4$CN | H |
| 41 | H | (4')-Cl | H | (2)-CH$_3$ | (4)-N(C$_2$H$_5$)C$_2$H$_4$CN | H |

| Example No. | λ max. (mμ) | α max. (l.g.⁻¹cm.⁻¹) | Shade on Polyester | Calculated C | H | N | Found C | H | N |
|---|---|---|---|---|---|---|---|---|---|
| 32 | 542 | 150 | Violet | 66.0 | 5.1 | 21.0 | 64.4 | 5.2 | 20.5 |
| 33 | 540 | 145 | Bright Bluish Red | 62.3 | 4.5 | 16.5 | 61.5 | 4.7 | 15.7 |
| 34 | 560 | 133 | Bluish Red | 76.4 | 5.1 | 18.6 | 74.6 | 5.8 | 19.3 |
| 35 | 560 | 118 | Violet | 66.0 | 5.0 | 21.0 | 66.9 | 5.7 | 17.8 |
| 36 | 520 | 92 | Bright Orange | 72.8 | 5.6 | 13.8 | 69.0 | 5.9 | 11.7 |
| 37 | 520 | 107 | Bright Orange | 68.1 | 4.7 | 13.7 | 67.9 | 4.6 | 12.9 |
| 38 | 540 | 124 | Bright Bluish Red | 67.8 | 5.2 | 18.0 | 67.2 | 5.0 | 17.3 |
| 39 | 460 | 121 | Reddish Yellow | 61.3 | 2.8 | 17.8 | 59.8 | 2.7 | 18.5 |
| 40 | 523 | 154 | Bright Orange | 67.2 | 6.0 | 19.6 | 67.3 | 5.2 | 19.2 |
| 41 | 520 | 153 | Bright | 67.2 | 6.0 | 19.6 | 67.2 | 5.1 | 19.4 |

| Example No. | A | B | C | X | Y | Z |
|---|---|---|---|---|---|---|
| 42 | H | (3')-Cl | H | H | (4)-N(C$_2$H$_5$)$_2$ | H |
| 43 | (2')-Cl | H | H | H | (4)-N(C$_2$H$_5$)$_2$ | H |
| 44 | H | H | H | (2)-Cl | (4)-N(CH$_3$)$_2$ | H |
| 45 | H | (4')-Cl | H | (2)-Cl | (4)-N(CH$_3$)$_2$ | H |
| 46 | (3')-Cl | (4')-Cl | H | H | (4)-N(C$_2$H$_5$)$_2$ | H |
| 47 | (3')-Cl | (4')-Cl | H | (2)-CH$_3$ | (4)-N(C$_2$H$_5$)C$_2$H$_4$CN | H |
| 48 | (2')-Cl | (6')-NO$_2$ | H | H | (4)-N(C$_2$H$_5$)$_2$ | H |
| 49 | — | 1-naphthyl | — | (2)-CH$_3$ | (4)-N(C$_2$H$_5$)C$_2$H$_4$CN | H |
| 50 | — | 1-naphthyl | — | H | (4)-N(CH$_2$CH$_2$CH$_2$CH$_3$)$_2$ | |

| Example No. | λ max. (mμ) | α max. (l.g.⁻¹cm.⁻¹) | Shade on Polyester | Calculated C | H | N | Found C | H | N |
|---|---|---|---|---|---|---|---|---|---|
| 42 | 533 | 152 | Bright Red | 67.8 | 5.2 | 18.0 | 68.0 | 5.3 | 17.4 |
| 43 | 540 | 118 | Bright Red | 67.8 | 5.2 | 18.0 | 68.0 | 5.5 | 17.4 |
| 44 | 510 | 145 | Orange | 66.4 | 4.5 | 19.3 | 64.7 | 5.1 | 17.1 |
| 45 | 519 | 148 | Orange | 61.1 | 3.8 | 17.6 | 61.2 | 5.4 | 12.1 |
| 46 | 540 | 157 | Bright Bluish Red | 62.2 | 4.5 | 16.5 | 60.7 | 4.6 | 15.6 |
| 47 | 518 | 162 | Scarlet | — | — | — | — | — | — |
| 48 | 550 | 139 | Violet | 60.8 | 4.4 | 19.3 | 60.9 | 4.4 | 19.1 |
| 49 | 527 | 158 | Scarlet | 75.4 | 5.4 | 18.9 | 76.2 | 5.8 | 17.8 |
| 50 | 540 | 146 | Red | 78.1 | 6.8 | 15.2 | 77.7 | 6.7 | 14.8 |

TABLE II-continued

| Example No. | A | B | C | X | Y | Z |
|---|---|---|---|---|---|---|
| 51 | (2')-Cl | H | (6')-Cl | (2)-$CH_3$ | (4)-$N(C_2H_5)_2$ | H |
| 52 | — | 1-naphthyl | — | (2)-$CH_3$ | (4)-$N(C_2H_5)_2$ | H |
| 53 | — | 1-naphthyl | — | H | (4)-$N(C_2H_5)C_2H_4$-$OCOC_6H_5$ | H |
| 54 | (2')-Cl | H | (6')-Cl | H | (4)-$N(C_2H_5)C_2H_4$-$OCOC_6H_5$ | H |
| 55 | — | 2-quinolinyl | — | H | (4)-$N(C_2H_5)_2$ | H |
| 56 | H | (3')-CN | H | H | (4)-$N(C_2H_5)_2$ | H |

| Example No. | λ max. (mμ) | " max. (l.g.$^{-1}$cm.$^{-1}$) | Shade on Polyester | Calculated C | Calculated H | Calculated N | Found C | Found H | Found N |
|---|---|---|---|---|---|---|---|---|---|
| 51 | 545 | 138 | Violet | 63.0 | 4.8 | 15.9 | 58.5 | 4.9 | 15.8 |
| 52 | 545 | 170 | Bright Bluish Red | 77.3 | 6.0 | 16.7 | 77.3 | 6.1 | 16.6 |
| 53 | 527 | 138 | Scarlet | 75.5 | 5.2 | 13.3 | 75.0 | 5.3 | 13.1 |
| 54 | 527 | 115 | Scarlet | 64.0 | 4.3 | 12.9 | 63.8 | 4.4 | 12.8 |
| 55 | 551 | 198 | Bright Bluish Red | 74.9 | 5.5 | 20.7 | 74.4 | 5.5 | 20.8 |
| 56 | 535 | 167 | Bright Bluish Red | 72.6 | 5.3 | 22.1 | 73.0 | 5.6 | 22.3 |

| Example No. | A | B | C | X | Y | Z |
|---|---|---|---|---|---|---|
| 57 | (2')-$NO_2$ | (4')-$NO_2$ | H | (2)-$CH_3$ | (4)-$N(C_2H_5)_2$ | H |
| 58 | (3')-Br | (4')-$OCH_3$ | (5')-$OCH_3$ | H | (4)-$N(C_2H_5)_2$ | H |
| 59 | (2')-OH | (3')-Br | (5')-Br | H | (4)-$N(C_2H_5)_2$ | H |
| 60 | (3')-Cl | (4')-Cl | H | (2)-$CH_3$ | (4)-$N(C_2H_5)_2$ | H |
| 61 | — | 2-thienyl | — | H | (4)-$N(C_2H_5)_2$ | H |
| 62 | — | 2-hydroxy-1-naphthyl | — | H | (4)-$N(C_2H_5)_2$ | H |
| 63 | (2')-F | H | H | H | (4)-$N(C_2H_5)_2$ | H |

| Example No. | λ max. (mμ) | " max. (l.g.$^{-1}$cm.$^{-1}$) | Shade on Polyester | Calculated C | Calculated H | Calculated N | Found C | Found H | Found N |
|---|---|---|---|---|---|---|---|---|---|
| 57 | 590 | 110 | Blue | 60.1 | 4.6 | 21.3 | 60.5 | 4.7 | 20.3 |
| 58 | 532 | 145 | Bright Scarlet | 58.3 | 4.9 | 14.2 | 59.3 | 5.0 | 14.3 |
| 59 | 560 | 107 | Bright Violet | 50.0 | 3.6 | 13.2 | 49.9 | 3.7 | 12.9 |
| 60 | 545 | 171 | Bright Bluish Red | 63.0 | 4.8 | 16.0 | 63.1 | 4.8 | 16.1 |
| 61 | 532 | 192 | Bright Red | — | — | — | — | — | — |
| 62 | 550 | 196 | Violet | 73.8 | 6.0 | 16.5 | 75.1 | 5.4 | 17.1 |
| 63 | 532 | 186 | Bright Red | 70.8 | 5.4 | 18.7 | 71.0 | 5.1 | 18.8 |

| Example No. | A | B | C | X | Y | Z |
|---|---|---|---|---|---|---|
| 64 | — | 1-naphthyl | — | (2)-Cl | (4)-$N(CH_3)_2$ | H |
| 65 | — | 2-hydroxy-1-naphthyl | — | (2)-$CH_3$ | (4)-$N(C_2H_5)_2$ | H |
| 66 | — | 1-naphthyl | — | (2)-$CH_3$ | (4)-$N(CH_2CH_2CH_2CH_3)_2$ | H |
| 67 | (3')-Cl | (4')-Cl | H | H | (4)-$N(CH_3)C_2H_4CO_2CH_3$ | H |
| 68 | (3')-Cl | (4')-Cl | H | (2)-Cl | (4)-$N(CH_3)_2$ | H |
| 69 | H | (4')-$OCH_3$ | H | H | (4)-$N(C_2H_5)_2$ | H |
| 70 | — | 1-naphthyl | — | (2)-$CH_3$ | (4)-$N(CH_3)_2$ | (6)-$CH_3$ |

| Example No. | λ max. (mμ) | " max. (l.g.$^{-1}$cm.$^{-1}$) | Shade on Polyester | Calculated C | Calculated H | Calculated N | Found C | Found H | Found N |
|---|---|---|---|---|---|---|---|---|---|
| 64 | 520 | 163 | Orange | 70.0 | 4.4 | 17.0 | 68.4 | 4.3 | 16.8 |
| 65 | 559 | 178 | Violet | 74.5 | 5.8 | 16.1 | 73.9 | 5.5 | 16.3 |
| 66 | 547 | 158 | Bluish Red | 78.3 | 7.0 | 14.7 | 77.8 | 6.7 | 14.9 |
| 67 | 521 | 152 | Bright Red | 61.0 | 3.9 | 14.2 | 58.7 | 4.2 | 14.9 |
| 68 | 520 | 150 | Bright Coral | 55.8 | 3.3 | 16.3 | 55.4 | 3.5 | 16.1 |
| 69 | 523 | 208 | Bright Scarlet | — | — | — | — | — | — |
| 70 | 540 | 175 | Bluish Red | — | — | — | — | — | — |

| Example No. | A | B | C | X | Y | Z |
|---|---|---|---|---|---|---|
| 71 | (2')-$CH(CH_3)_2$ | (4')-Br | (5')-$CH(CH_3)_2$ | (2)-$CH_3$ | (4)-$N(C_2H_5)C_2H_4CN$ | H |
| 72 | H | (4')-Br | H | (2)-$CH_3$ | (4)-$N(C_2H_5)_2$ | H |
| 73 | H | (4')-Br | H | H | (4)-$N(CH_2CH_2CH_2CH_3)_2$ | H |
| 74 | (2')-$CH(CH_3)_2$ | (4')-Br | (5')-$CH(CH_3)_2$ | (2)-$CH_3$ | (4)-$N(C_2H_5)_2$ | H |
| 75 | (2')-$CH(CH_3)_2$ | (4')-Br | (5')-$CH(CH_3)_2$ | H | (4)-$N(C_2H_5)_2$ | H |
| 76 | — | 2-thienyl | — | (2)-$CH_3$ | (4)-$N(C_2H_5)_2$ | H |
| 77 | H | (4')-$OCH_3$ | H | (2)-$CH_3$ | (4)-$N(C_2H_5)_2$ | H |
| 78 | — | 4,5-dibromo-2-thienyl | — | (2)-$CH_3$ | (4)-$N(C_2H_5)_2$ | H |
| 79 | — | 4,5-dibromo-2-thienyl | — | H | (4)-$N(CH_2CH_2CH_3)_2$ | H |
| 80 | — | 4,5-dibromo-2-thienyl | — | H | (4)-$N(CH_3)C_2H_4CO_2CH_3$ | H |
| 81 | — | 4,5-dibromo-2-thienyl | — | H | (4)-$N(C_2H_5)_2$ | H |
| 82 | — | 4,5-dibromo-2-thienyl | — | — | 5-diethylamino-2-thiazolyl | — |
| 83 | — | 4,5-dibromo-2-thienyl | — | (2)-$CH_3$ | (4)-$N(CH_2CH_2CH_3)_2$ | H |

TABLE II-continued

| Example No. | λ max. (mμ) | " max. (l.g.⁻¹cm.⁻¹) | Shade on Polyester | Calculated C | H | N | Found C | H | N |
|---|---|---|---|---|---|---|---|---|---|
| 71 | 521 | 123 | Scarlet | 64.6 | 5.9 | 15.1 | 63.1 | 5.4 | 15.8 |
| 72 | 540 | 158 | Bluish-red | 61.6 | 4.9 | 15.6 | 61.0 | 4.2 | 15.7 |
| 73 | 532 | 161 | Red | 63.4 | 6.1 | 14.2 | 61.9 | 5.9 | 14.8 |
| 74 | 542 | 140 | Bluish-red | 65.4 | 6.4 | 13.1 | 64.9 | 5.9 | 13.2 |
| 75 | 535 | 145 | Red | 64.9 | 6.2 | 13.5 | 64.4 | 6.1 | 13.9 |
| 76 | 535 | 194 | Red | 67.2 | 5.6 | 18.6 | 69.5 | 5.3 | 18.1 |
| 77 | 525 | 192 | Scarlet | 72.1 | 6.3 | 17.5 | 73.0 | 6.0 | 17.9 |
| 78 | 560 | 187 | Bluish-red | 47.3 | 3.6 | 13.1 | 47.4 | 3.8 | 13.7 |
| 79 | 553 | 127 | Bluish-red | 48.2 | 3.8 | 12.8 | 48.5 | 3.3 | 12.5 |
| 80 | 534 | 114 | Red | 44.8 | 3.0 | 12.4 | 44.1 | 2.8 | 12.7 |
| 81 | 550 | 150 | Bluish-red | 46.2 | 3.3 | 13.5 | 46.5 | 2.9 | 13.4 |
| 82 | 522 | 135 | Scarlet | 49.9 | 2.5 | 15.0 | 50.3 | 2.7 | 14.4 |
| 83 | 558 | 130 | Violet | 49.2 | 4.1 | 12.5 | 49.0 | 3.8 | 12.1 |

| Example No. | A | B | C | X | Y | Z |
|---|---|---|---|---|---|---|
| 84 | H | (4')-OCH₃ | H | H | (4)-NHCOCH₃ | H |
| 85 | H | (4')-OCH₃ | H | (2)-CH₃ | (4)-N(CH₂CH₂CH₃)₂ | H |
| 86 | H | (4')-OCH₃ | H | (2)-Cl | (4)-N(CH₃)₂ | H |
| 87 | H | (4')-OCH₃ | H | — | 6-N-(methyl)-2,2,4,7-tetramethyl-1,2,3,4-tetrahydroquinolyl | — |
| 88 | H | (4')-NHCOCH₃ | H | — | 6-N-(methyl)-2,2,4,7-tetramethyl-1,2,3,4-tetrahydroquinolyl | — |
| 89 | — | 5-bromo-2-thienyl | — | (2)-Cl | (4)-N(CH₃)₂ | H |
| 90 | — | 5-Bromo-2-thienyl | — | (2)-CH₃ | (4)-N(C₂H₅)₂ | H |
| 91 | — | 5-bromo-2-thienyl | — | H | (4)-NHCOCH₃ | H |
| 92 | — | 5-bromo-2-thienyl | — | H | (4)-N(C₂H₅)₂ | H |
| 93 | — | 5-bromo-2-thienyl | — | H | (4)-N(CH₃)C₂H₄CO₂CH₃ | H |
| 94 | — | 5-bromo-2-thienyl | — | (2)-CH₃ | (4)-N(CH₂CH₂CH₃)₂ | H |
| 95 | — | 5-bromo-2-thienyl | — | — | 4-diethylamino-1-naphthyl | — |
| 96 | — | 5-bromo-2-thienyl | — | (2)-CH₃ | (4)-N(C₂H₅)C₂H₄CO₂CH₃ | H |

| Example No. | λ max. (mμ) | " max. (l.g.⁻¹cm.⁻¹) | Shade on Polyester | Calculated C | H | N | Found C | H | N |
|---|---|---|---|---|---|---|---|---|---|
| 84 | 432 | 174 | Yellow | 67.5 | 5.15 | 18.8 | 63.3 | 4.2 | 17.9 |
| 85 | 532 | 157 | Scarlet | 69.7 | 9.4 | 16.9 | 69.4 | 8.7 | 16.5 |
| 86 | 508 | 169 | Orange | 78.5 | 4.9 | 19.1 | 77.2 | 4.7 | 19.3 |
| 87 | 535 | 154 | Bluish-red | 72.5 | 6.8 | 16.9 | 71.8 | 6.2 | 17.4 |
| 88 | 543 | 167 | Bluish-red | 71.9 | 6.6 | 18.0 | 73.7 | 6.1 | 18.7 |
| 89 | 531 | 114 | Red | 48.4 | 2.9 | 15.7 | 49.3 | 2.4 | 16.1 |
| 90 | 553 | 155 | Bluish-red | 55.5 | 4.4 | 15.4 | 55.4 | 4.4 | 16.1 |
| 91 | 444 | 145 | Yellow | 50.4 | 3.3 | 16.7 | 50.3 | 2.8 | 16.4 |
| 92 | 537 | 159 | Bluish-red | 54.6 | 4.2 | 15.9 | 53.8 | 4.1 | 13.5 |
| 93 | 524 | 139 | Red | 52.1 | 3.7 | 14.5 | 51.9 | 3.5 | 14.3 |
| 94 | 555 | 145 | Bluish-red | 57.3 | 5.0 | 14.5 | 57.4 | 4.2 | 13.9 |
| 95 | 515 | 94 | Scarlet | 58.8 | 4.1 | 14.3 | 59.4 | 4.6 | 14.6 |
| 96 | 535 | 138 | Bluish-red | 53.9 | 4.3 | 13.7 | 53.7 | 4.1 | 13.3 |

| Example No. | A | B | C | X | Y | Z |
|---|---|---|---|---|---|---|
| 97 | — | 5-bromo-2-thienyl | — | (2)-CH₃ | (4)—N(C₂H₅)C₂H₄CO₂CH₂CH₂CH₂CH₃ | H |
| 98 | — | 5-bromo-2-thienyl | — | (2)-CH₃ | (4)—N(C₂H₅)CH₂CHCH₂OC₆H₅<br>                       OCONHC₆H₅ | H |
| 99 | — | -naphthyl | — | H | (4)—NHCOCH₃ | H |
| 100 | (3')-Cl | (4')-Cl | H | H | (4)—N(CH₂CH₂CH₃)₂ | H |
| 101 | H | (3')-NO₂ | H | H | (4)—N(C₂H₅)₂ | H |
| 102 | H | (3')-NO₂ | H | H | (4)—N(CH₃)C₂H₄CO₂CH₃ | H |
| 103 | H | (3')-NO₂ | H | (2)-Cl | (4)—N(CH₃)₂ | H |
| 104 | H | (3')-NO₂ | H | (2)-CH₃ | (4)—N(CH₂CH₂CH₃)₂ | H |
| 105 | H | (3')-NO₂ | H | (2)-CH₃ | (4)—N(C₂H₅)C₂H₄CO₂CH₃ | H |
| 106 | H | (3')-NO₂ | H | (2)-CH₃ | (4)—N(C₂H₅)C₂H₄CO₂CH₂CH₂CH₂CH₃ | H |
| 107 | H | (3')-NO₂ | H | (2)-CH₃ | (4)—N(C₂H₅)CH₂CHCH₂OC₆H₅H<br>                      OCONHC₆H₅ | |
| 108 | H | H | H | H | (4)—N(CH₃)C₂H₄CO₂CH₃ | H |

| Example No. | λ max. (mμ) | " max. (l.g.⁻¹cm.⁻¹) | Shade on Polyester | Calculated C | H | N | Found C | H | N |
|---|---|---|---|---|---|---|---|---|---|
| 97 | 535 | 110 | Bluish-red | 56.3 | 5.1 | 12.6 | 55.1 | 4.8 | 13.7 |
| 98 | 534 | 105 | Bluish-red | — | — | — | — | — | — |
| 99 | 440 | 116 | Yellow | 73.7 | 4.3 | 17.9 | 74.1 | 4.2 | 18.5 |
| 100 | 544 | 138 | Bluish-red | 64.4 | 5.4 | 15.0 | 62.8 | 5.1 | 16.3 |
| 101 | 534 | 164 | Bluish-red | 66.0 | 5.0 | 21.0 | 64.6 | 4.5 | 20.7 |
| 102 | 519 | 128 | Red | 62.1 | 4.5 | 18.9 | 63.0 | 4.2 | 19.7 |
| 103 | 518 | 141 | Orange | 59.1 | 3.7 | 20.7 | 58.7 | 4.2 | 23.0 |
| 104 | 543 | 154 | Bluish-red | 66.4 | 8.0 | 18.6 | 61.2 | 7.1 | 19.7 |
| 105 | 531 | 141 | Red | 63.5 | 5.1 | 17.8 | 63.9 | 5.0 | 17.9 |
| 106 | 531 | 117 | Red | 65.4 | 5.8 | 16.3 | 64.1 | 4.9 | 15.8 |
| 107 | 530 | 100 | Red | 75.1 | 5.6 | 16.6 | 77.0 | 4.9 | 15.9 |
| 108 | 507 | 144 | Orange | 69.2 | 5.3 | 17.5 | 68.4 | 5.9 | 17.7 |

TABLE II-continued

| Example No. | A | B | C | X | Y | Z |
|---|---|---|---|---|---|---|
| 109 | H | (4')-NHCOCH₃ | H | (2)-CH₃ | (4)—N(C₂H₅)₂ | H |
| 110 | H | (4')-NHCOCH₃ | H | H | (4)—N(CH₂CH₂CH₃)₂ | H |
| 111 | H | (4')-NHCOC₂H₅ | H | (2)-CH₃ | (4)—N(C₂H₅)₂ | H |
| 112 | H | (4')-NHCOC₂H₅ | H | H | (4)—N(CH₃)C₂H₄CO₂CH₃ | H |
| 113 | H | (4')-OCH₃ | H | (2)-CH₃ | (4)—N(C₂H₅)C₂H₄CO₂CH₃ | H |
| 114 | H | (2')-Cl | H | H | (4)—N(CH₃)C₂H₄CO₂CH₃ | H |
| 115 | H | (2')-Cl | H | (2)-CH₃ | (4)—N(C₂H₅)C₂H₄CO₂CH₃ | H |
| 116 | H | (2')-Cl | H | (2)-CH₃ | (4)—N(C₂H₅)CH₂CHCH₂OC₆H₅<br>                               OCONHC₆H₅ | H |
| 117 | (3')-Cl | (4')-Cl | H | H | (4)—N(CH₃)C₂H₄CO₂CH₃ | H |
| 118 | — | 3-(N-methyl)indolyl | — | H | (4)—N(C₂H₅)₂ | H |

| Example No. | λ max. (mμ) | ª max. (l.g.⁻¹cm.⁻¹) | Shade on Polyester | Calculated C | Calculated H | Calculated N | Found C | Found H | Found N |
|---|---|---|---|---|---|---|---|---|---|
| 109 | 532 | 171 | Red | 70.4 | 6.1 | 19.7 | 71.3 | 6.8 | 21.0 |
| 110 | 527 | 174 | Red | 70.9 | 6.4 | 19.1 | 70.5 | 6.2 | 19.4 |
| 111 | 532 | 139 | Red | 70.4 | 6.1 | 19.7 | 70.5 | 6.7 | 19.4 |
| 112 | 510 | 122 | Orange | 66.4 | 5.5 | 17.9 | 66.0 | 5.2 | 17.7 |
| 113 | 518 | 150 | Scarlet | 68.3 | 5.9 | 15.3 | 67.9 | 6.4 | 16.2 |
| 114 | 520 | 131 | Scarlet | 63.9 | 4.4 | 16.2 | 65.2 | 4.5 | 15.8 |
| 115 | 532 | 129 | Red | 65.1 | 5.2 | 15.2 | 64.4 | 4.9 | 16.3 |
| 116 | 530 | 78 | Red | — | — | — | — | — | — |
| 117 | 519 | 152 | Scarlet | 59.0 | 4.1 | 15.0 | 57.3 | 3.7 | 17.1 |
| 118 | 525 | 215 | Scarlet | 73.5 | 5.9 | 20.6 | 70.4 | 5.2 | 19.1 |

I claim:

1. Improved process of preparing the bisanil dye of the formula $Ar_1$—CH=N—C(CN)=C(CN)—N=CH—$Ar_2$ wherein each of $Ar_1$ and $Ar_2$ is independently selected from phenyl and naphthyl groups containing 0–3 substituents selected from $NO_2$, halogen, CN, $C_{1-4}$ alkyl, $C_{1-4}$ alkoxy, $OCH_2$-phenyl, phenyl, $CF_3$, OH, $OC_{1-4}$alkylene-N($C_{1-4}$ alkyl)₂, $C_{2-4}$ alkylene-Cl, $NHCONH_2$, NHCOA, $NHSO_2A$, $SR_8$, $SO_2R_8$, $NHR_1$, $NHCOC_{1-4}$ alkylene-B and -$NR_1R_2$ wherein:

a. $R_1$ is $C_{1-4}$ alkyl or $C_{2-4}$ alkylene-$R_3$;

b. $R_2$ is $C_{1-4}$ alkyl, $C_{2-4}$ alkylene-$R_4$, or, if $Ar_1$ or $Ar_2$ is phenyl, $C_3$ alkylene attached to a phenyl position which is ortho to the position to which the nitrogen is attached;

c. $R_3$ is CN, halogen, OH, phenyl, $C_{1-4}$ alkoxy, $OC_{1-4}$ alkylene-CN, $CO_2A$, OCOA, OCONHA or $CO_2C_{1-4}$ alkylene-OCOA:

d. $R_4$ is CN, halogen, OH, phenyl, $OC_{1-4}$ alkylene-CN, $CO_2A$, OCOA, $CO_2C_{1-4}$ alkylene-OCOA, $SO_2A$, phthalimido, succinimido, glutarimide, $OCOCH=CH_2$, $CH_2$—CH(OCOA)$CH_2$OA or $CH_2CH(OCONHA)CH_2OA$:

e. A is $C_{1-4}$ alkyl or $R_5$;

f. B is halogen, $C_{1-4}$ alkoxy or $R_5$;

g. $R_5$ is phenyl containing 0–2 substituents selected from $C_{1-4}$ alkyl, $C_{1-4}$ alkoxy, halogen, $NO_2$, CN, $C_{1-4}$ alkyl-CONH and $NR_6R_7$ wherein each of $R_6$ and $R_7$ is independently selected from H and $C_{1-4}$ alkyl, with at least one of $R_6$ and $R_7$ being $C_{1-4}$ alkyl; and h. $R_8$ is $C_{1-4}$ alkyl, $C_2H_4OH$, $C_{5-6}$ cycloalkyl or $R_5$;

said bisanil dye being substantially free of imidazole impurities, which process comprises the steps:

1. condensing diaminomaleonitrile and the aromatic aldehyde $Ar_1CHO$ to produce the monoanil $Ar_1$—CH=N—C(CN)=C(CN)—$NH_2$;

2. reducing the monoanil from step (1) to produce $Ar_1CH_2NH$—C(CN)=C(CN)—$NH_2$;

3. condensing the product from step (2) and the aromatic aldehyde $Ar_2CHO$, which aldehyde is the same as or different from the aldehyde of step (1), to produce the monoanil $Ar_1CH_2NH$—C(CN)=C(CN)—N=CH—$Ar_2$; and 4. oxidizing the monoanil from step (3) with manganese dioxide, at ambient temperature, in the presence of a solvent selected from the group consisting of dimethylformamide, dimethylacetamide, dimethylsulfoxide, hexamethylphosphoramide and N-methylpyrrolidone to produce the bisanil dye $Ar_1$—CH=N—C(CN)=C(CN)—N=CH—$Ar_2$.

2. Process of claim 1 wherein in step (4) the solvent is dimethylformamide, the temperature is 25°–30°C. and the reaction time is about 4 hours.

3. Process of claim 2 wherein $Ar_1$ and $Ar_2$ are the same.

4. Process of claim 2 wherein $Ar_1$ and $Ar_2$ are different.

5. Process of claim 2 wherein the reducing agent employed in step (2) is sodium borohydride.

6. Process of claim 2 wherein step (1) is carried out in the presence of an organic solvent other than a ketone or aldehyde which can react with diaminomaleonitrile, at a temperature of 20°–80°C., for 4–17 hours; step (2) is carried out in the presence of an organic solvent, at a temperature not in excess of 35°C., with at least 0.50 mole of reducing agent per mole of monoanil; and step (3) is carried out in the presence of an organic solvent.

7. Process of claim 6 wherein an acid catalyst is employed in steps (1) and (3) and the temperature in step (2) is 10°–35°C.

8. Process of claim 7 wherein in steps (1) and (3) the solvent is selected from tetrahydrofuran, ethyl Cellosolve, dimethylformamide, methanol, ethanol and mixtures thereof, the acid catalyst is selected from sulfuric acid, hydrochloric acid, p-toluenesulfonic acid and trifluoroacetic acid and the temperature is 25°–30°C.; and in step (2) the solvent is selected from tetrahydrofuran, methanol, ethanol and ethyl Cellosolve and the temperature is less than 25°C.

9. Process of claim 8 wherein the solvent in step (2) is methanol or ethanol.

\* \* \* \* \*

UNITED STATES PATENT OFFICE
CERTIFICATE OF CORRECTION

PATENT NO. : 3,912,724
DATED : October 14, 1975
INVENTOR(S) : Robert Walter Begland It is certified that error appears in the above–identified patent and that said Letters Patent are hereby corrected as shown below:

Column 33, line 27, at the end of the line, "$\lambda$" should be deleted.

Signed and Sealed this ninth Day of March 1976

[SEAL]

Attest:

RUTH C. MASON
*Attesting Officer*

C. MARSHALL DANN
*Commissioner of Patents and Trademarks*